(12) United States Patent
Nishikawa

(10) Patent No.: US 10,320,900 B2
(45) Date of Patent: Jun. 11, 2019

(54) COMMUNICATION CONTROL METHOD, COMMUNICATION CONTROLLER, TELEPRESENCE ROBOT, AND RECORDING MEDIUM STORING PROGRAM

(71) Applicant: Panasonic Intellectual Property Management Co., Ltd., Osaka (JP)

(72) Inventor: Yuri Nishikawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/973,464

(22) Filed: May 7, 2018

(65) Prior Publication Data

US 2018/0337985 A1 Nov. 22, 2018

(30) Foreign Application Priority Data

May 22, 2017 (JP) .................. 2017-100761

(51) Int. Cl.
| | | |
|---|---|---|
| *H04N 7/14* | (2006.01) | |
| *H04L 29/08* | (2006.01) | |
| *H04N 7/15* | (2006.01) | |
| *H04L 29/06* | (2006.01) | |
| *H04L 12/18* | (2006.01) | |
| *H04L 12/24* | (2006.01) | |

(52) U.S. Cl.
CPC .......... *H04L 67/1059* (2013.01); *H04L 12/18* (2013.01); *H04L 41/00* (2013.01); *H04L 65/1073* (2013.01); *H04L 65/1083* (2013.01); *H04L 65/403* (2013.01); *H04L 65/4038* (2013.01); *H04L 67/1051* (2013.01); *H04N 7/15* (2013.01); *H04L 67/12* (2013.01); *H04L 67/24* (2013.01); *H04N 7/152* (2013.01)

(58) Field of Classification Search
CPC ............ H04L 65/1073; H04L 65/1083; H04L 65/403; H04L 65/4038; H04L 67/1051; H04L 67/1059; H04N 7/15; H04W 72/085; H04W 84/20
USPC ........... 348/14.1, 14.02, 14.05, 14.08, 14.09, 348/14.11
See application file for complete search history.

(56) References Cited

U.S. PATENT DOCUMENTS 7,145,909 B2 * 12/2006 Romy ................. H04L 12/5601
370/395.1
8,374,194 B2 * 2/2013 Tanaka ................. H04J 3/1694
370/458

(Continued)

FOREIGN PATENT DOCUMENTS

JP 2001-136177 5/2001
JP 2002-111689 4/2002

*Primary Examiner* — Khai N. Nguyen
(74) *Attorney, Agent, or Firm* — Greenblum & Bernstein, P.L.C.

(57) ABSTRACT

A communication control method includes detecting whether one master terminal, and m (m is an integer not less than 1 and not more than n-1) slave terminals among n (n is an integer not less than 2) slave terminals are in a conversation state, and in response to detecting that the master terminal and the m slave terminals are in the conversation state, disconnecting the master terminal and the m slave terminals from the basic network, and forming a first sub-network, the first sub-network including the master terminal as a master and each of the m slave terminals as a slave.

14 Claims, 16 Drawing Sheets

(56) References Cited

U.S. PATENT DOCUMENTS

| | | | |
|---|---|---|---|
| 8,819,170 B2* | 8/2014 | Cohen | H04L 67/125 709/217 |
| 9,014,750 B2* | 4/2015 | Todoroki | H04B 7/0452 455/101 |
| 9,673,864 B2* | 6/2017 | Czaja | H04B 5/0031 |
| 2002/0055978 A1 | 5/2002 | Joon-Bo et al. | |
| 2003/0124979 A1* | 7/2003 | Tanada | H04W 84/20 455/41.1 |
| 2007/0115827 A1* | 5/2007 | Boehnke | G08C 17/02 370/236 |
| 2008/0008109 A1* | 1/2008 | Ollis | H04L 29/12584 370/310 |
| 2010/0254407 A1* | 10/2010 | Tanaka | H04J 3/1694 370/468 |
| 2013/0018979 A1* | 1/2013 | Cohen | H04L 67/125 709/217 |
| 2013/0295984 A1* | 11/2013 | Todoroki | H04B 7/0452 455/550.1 |
| 2015/0249482 A1* | 9/2015 | Czaja | H04B 5/0031 455/41.1 |
| 2016/0105320 A1* | 4/2016 | Osterberg | H04L 41/0853 709/208 |
| 2016/0330574 A1* | 11/2016 | Wuts | H04L 67/1095 |
| 2016/0352208 A1* | 12/2016 | Wien | H02M 1/0845 |

* cited by examiner

FIG. 4

| ROBOT ID | PRIORITY |
|---|---|
| A | 1 |
| B | 2 |
| C | 3 |
| D | 4 |
| E | 5 |

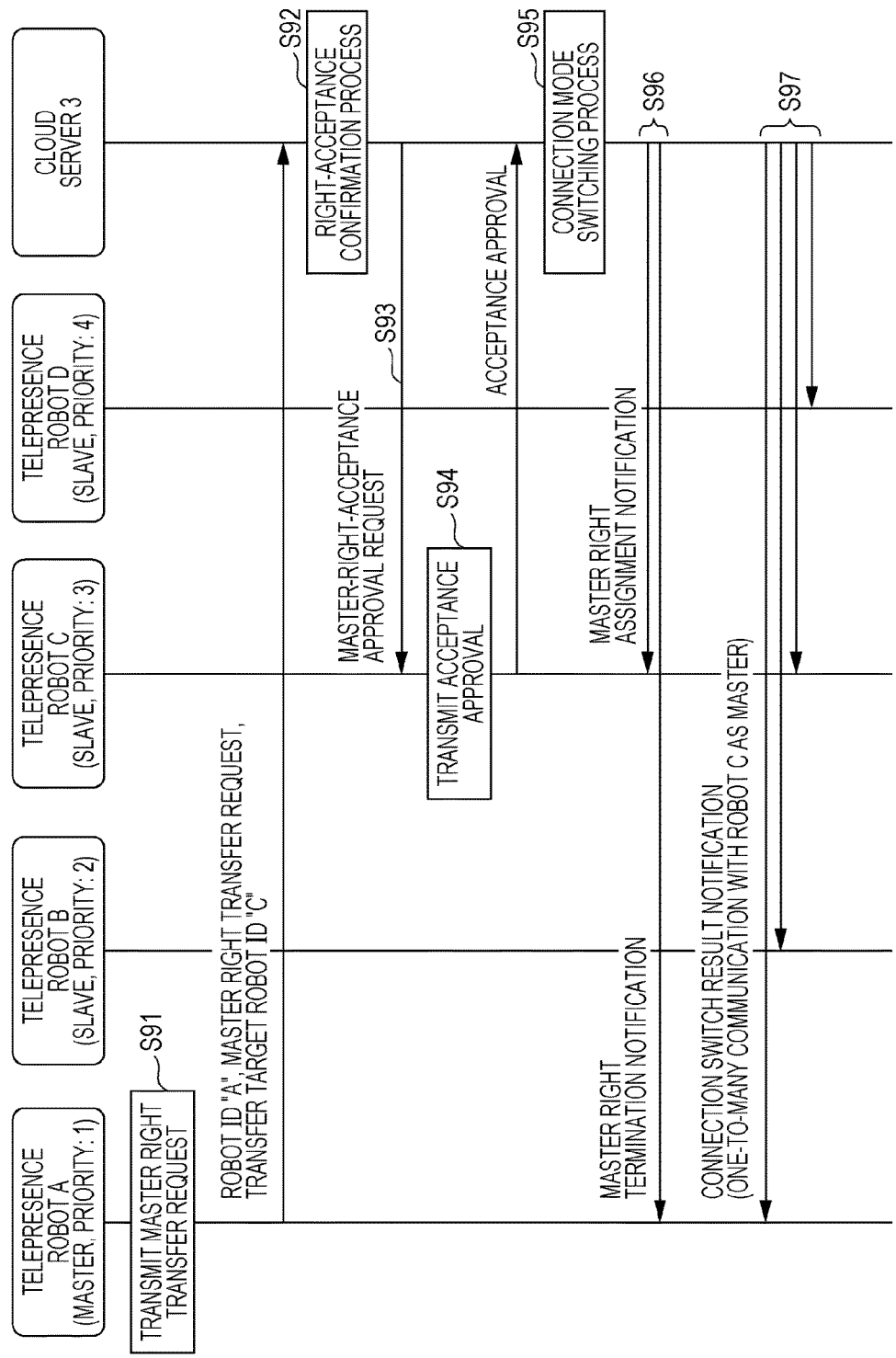

COMMUNICATION CONTROL METHOD, COMMUNICATION CONTROLLER, TELEPRESENCE ROBOT, AND RECORDING MEDIUM STORING PROGRAM

BACKGROUND

1. Technical Field

The present disclosure relates to a communication system including one master terminal, and a plurality of slave terminals communicatively connected to the master terminal by a basic network representing a one-to-many connection, and a communication controller that controls communication between the master terminal and the plurality of slave terminals.

2. Description of the Related Art

In a one-to-many connection network with one terminal acting as a master and the remaining terminals as slaves, if the master terminal leaves the network due to dead battery or other reasons, a new master terminal is determined from among the slave terminals.

For example, Japanese Unexamined Patent Application Publication No. 2002-111689 discloses a communication system in which one of a plurality of communication devices equipped with a Bluetooth (registered trademark) communication unit acts as a master, and the remaining communication devices act as slaves to perform one-to-many communication. According to Japanese Unexamined Patent Application Publication No. 2002-111689, the master determines in advance, for each of a plurality of slaves, a priority in being selected as a master, based on information about the communication quality of each slave. Further, according to Japanese Unexamined Patent Application Publication No. 2002-111689, in situations where the master is no longer able to play the role of the master, such as when the master leaves the network operation area, one master is determined from among the plurality of slaves in accordance with the priority determined in advance.

Japanese Unexamined Patent Application Publication No. 2001-136177 discloses the following technique. That is, for a communication network in which a master terminal: 10 and slave terminals: 11, 12, and 13 perform one-to-many communication, if the master terminal leaves the network due to dead battery or other reasons, a master is determined from among the slave terminals: 11, 12, and 13. Specifically, according to Japanese Unexamined Patent Application Publication No. 2001-136177, the master terminal: 10 and the slave terminals: 11, 12, and 13 sequentially transmit packets in this order, and when the master terminal: 10 leaves the network, the slave terminal: 11, which is given the next highest transmission priority after the master terminal: 10, becomes a master terminal.

SUMMARY

In one general aspect, the techniques disclosed here feature a communication control method of a communication controller that controls communication between one master terminal and n (n is an integer not less than 2) slave terminals communicatively connected to the master terminal by a basic network representing a one-to-many connection, the communication control method including detecting whether the master terminal, and m (m is an integer not less than 1 and not more than n-1) slave terminals among the n slave terminals are in a conversation state, and in response to detecting that the master terminal and the m slave terminals are in the conversation state, disconnecting the master terminal and the m slave terminals from the basic network, and forming a first sub-network, the first sub-network including the master terminal as a master and each of the m slave terminals as a slave.

According to the present disclosure, if a conversation is initiated between specific users on a basic network representing a one-to-many connection, the network can be configured such that only the users who have initiated the conversation are able to converse with each other.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates an exemplary data structure of a priority management DB;

FIG. 16 is a sequence diagram illustrating an exemplary process performed by the communication system according to Embodiment 4 of the present disclosure.

DETAILED DESCRIPTION

Underlying Knowledge Forming Basis of the Present Disclosure

In recent years, the ever-improving ability of robots to communicate with humans has led to development of telepresence robots that incorporate technologies such as video conferencing and remote manipulation into autonomous mobile robots. Telepresence robots each work as an avatar of a communication source user to perform tasks such as walking around various places at a remote location or making a voice call with a communication target user. Telepresence robots are thus able to realize favorable communication while giving a sense of presence not previously available to a communication target user. As a result, telepresence robots are becoming increasingly common in telecommuting, various events, offices, education, or other applications.

Figure 1:
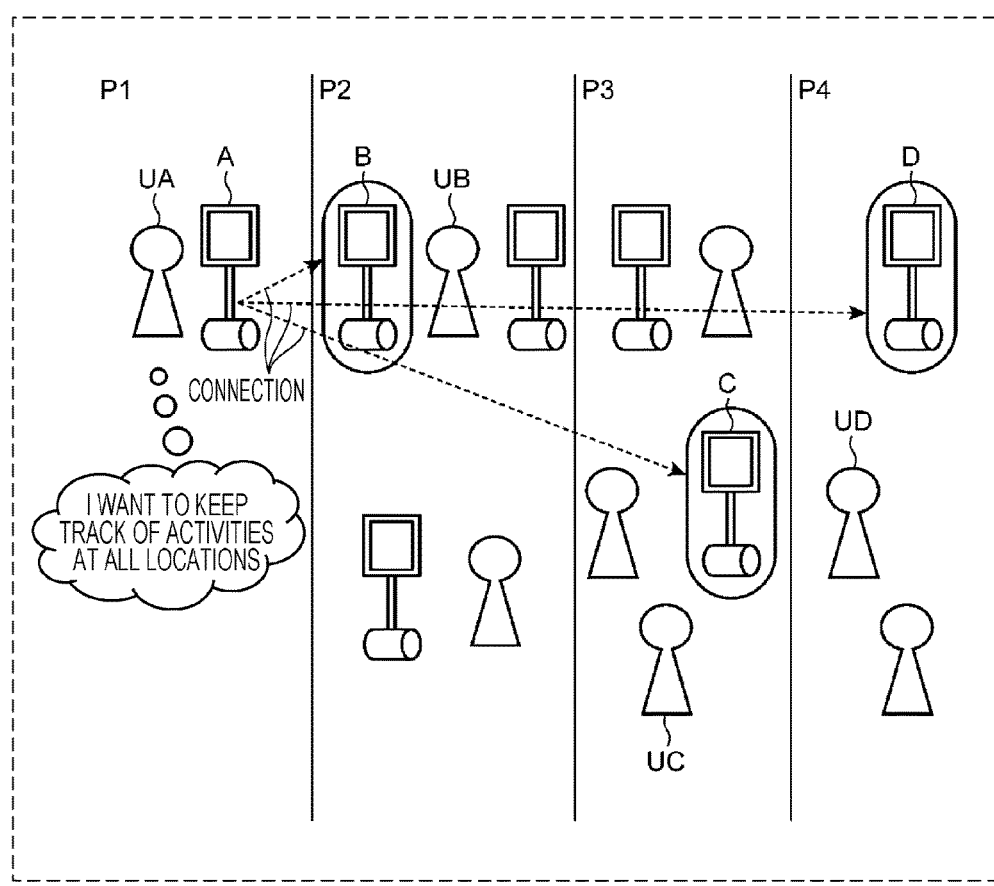
FIG. 1 conceptually illustrates an exemplary future office environment.

Now, a future office environment is considered in which a plurality of telepresence robots and a plurality of humans coexist. FIG. 1 conceptually illustrates an exemplary future office environment. This office environment includes four remote locations P1 to P4. A user UA, who is the leader of a given group constituting a company that provides this office environment, is present at the location P1. Users UB, UC, and UD, who are the subordinates of the user UA, are respectively present at the locations P2, P3, and P4. The locations P1 to P4 include not only rooms within the company's building but also user's homes.

For an office environment in which the subordinates are scattered across remote locations as described above, it would be convenient if the leader is able to keep track of the activities of remote subordinates at all times, and also proceed with work as if the leader and the subordinates are physically present at the same location.

Accordingly, in the office environment illustrated in FIG. 1, a telepresence robot A of the user UA acts as a master, and respective telepresence robots B to D of the remote users UB to UD act as slaves, with the telepresence robots A to D being constantly connected by a one-to-many connection network. Consequently, the audio and video of each of the users UB to UD are constantly output to the telepresence robot A, whereas the audio and video of only the user UA are constantly output to the telepresence robots B to D. As a result, the user UA is able to proceed with work as if physically present at the same location as the users UB to UD, and the users UB to UD are able to approach their work with a sense of tension while being aware of the remote presence of the user UA.

In some situations, the user UA may want to have a conversation such as a private talk with a particular subordinate, for example, the user UB. However, the one-to-many connection between the telepresence robots A to D means that the audio and video of the user UA are also output form the respective telepresence robots C and D of the users UC and UD. This results in the conversation between the user UA and the user UB being heard also by the users UC and UD.

According to both Japanese Unexamined Patent Application Publication Nos. 2002-111689 and 2001-1361772, network reconfiguration is triggered by the master terminal leaving the network due to dead battery or other reasons, with no consideration given to the conversation of users using their terminals. Consequently, it is not possible to configure a network such that if a conversation is initiated between specific users, only the users who have initiated the conversation are able to converse with each other.

The present disclosure provides a communication control method or other techniques for configuring a network such that, if a conversation is initiated between specific users, only the users who have initiated the conversion are able to converse with each other.

According to one aspect of the present disclosure, there is provided a communication control method for a communication controller, the communication controller controlling communication between one master terminal and n (n is an integer not less than 2) slave terminals communicatively connected to the master terminal by a basic network representing a one-to-many connection, the communication control method including:

detecting whether the master terminal, and m (m is an integer not less than 1 and not more than n-1) slave terminals among the n slave terminals are in a conversation state; and in response to detecting that the master terminal and the m slave terminals are in the conversation state, disconnecting the master terminal and the m slave terminals from the basic network, and forming a first sub-network, the first sub-network including the master terminal as a master and each of the m slave terminals as a slave.

In accordance with the above aspect, if the master terminal and the m slave terminals are detected to be in a conversation state, the master terminal and the m slave terminals are disconnected from the basic network, and a first sub-network is formed. This configuration makes it possible to configure a network such that if a conversation is initiated between the user of the master terminal and the users of the m slave terminals, only the users who have initiated the conversation are able to converse with each other. This helps prevent a conversation such as a private talk conducted between the user of the master terminal and the users of the m slave terminals from being heard by a user not involved in the conversation.

In another possible implementation of the above aspect, the communication controller includes a priority management database to manage a priority determined in advance for each of the n slave terminals, and the communication control method further includes, if the number of (n-m) slave terminals corresponding to the number of slave terminals not in the conversation state with the master terminal is two or more, disconnecting the (n-m) slave terminals from the basic network, and forming a second sub-network with a first slave terminal as a master and a second slave terminal as a slave, the first slave terminal being a slave terminal of which the priority is highest among the (n-m) slave terminals, the second slave terminal corresponding to each of remaining (n-m-1) slave terminals.

In accordance with the above aspect, if the number of (n-m) slave terminals corresponding to the number of slave terminals that are not in the conversation state is two or more, the (n-m) slave terminals are disconnected from the basic network, and a second sub-network is formed with a first slave terminal as a master and a second slave terminal as a slave, the first slave terminal being the slave terminal with the highest priority among the (n-m) slave terminals, the second slave terminal corresponding to each of the remaining (n-m-1) slave terminals. Consequently, if a conversation is initiated between the user of the master terminal and the users of the m slave terminals, the users of the (n-m) slave terminals not involved in the conversation with the user of the master terminal are also able to converse by use of their own slave terminals. This enables effective utilization of communication resources.

In another possible implementation of the above aspect, the communication control method further includes, in response to detecting the end of the conversation state between the master terminal and the m slave terminals, disconnecting the master terminal and the m slave terminals from the first sub-network, and forming the basic network that includes the master terminal as a master and each of the n slave terminals as a slave again.

In accordance with the above aspect, when a conversation between the user of the master terminal and the users of the m slave terminals ends, the master terminal and the n slave terminals are connected by the basic network again. This configuration enables the master terminal and the n slave terminals to be communicatively connected again by the basic network without necessitating the user to make troublesome settings, such as selecting which terminal as a master and which terminal as a slave.

In another possible implementation, the communication control method further includes, in response to detecting the end of the conversation state between the master terminal and the m slave terminals:

disconnecting the master terminal and the m slave terminals from the first sub-network, and disconnecting the first slave terminal and the (n-m-1) second slave terminals from the second sub-network; and forming the basic network again, the basic network including the master terminal as a master and each of the m slave terminals, the first slave terminal, and the (n-m-1) second slave terminals as a slave.

In accordance with the above aspect, when a conversation between the user of the master terminal and the users of the m slave terminals ends, the master terminal and the n slave terminals are communicatively connected by the basic network again. This configuration enables the master terminal and the n slave terminals to be communicatively connected again by the basic network without necessitating the user to make troublesome settings, such as selecting which terminal as a master and which terminal as a slave.

In another possible implementation of the above aspect, the communication controller includes a priority management database to manage a priority determined in advance for each of at least the n slave terminals, and the communication control method further includes, in response to acquiring, while the master terminal and the n slave terminals are communicatively connected by the basic network, a leave request that requests a leave from the basic network to perform private communication between k (k is an integer not less than 2 and not more than n) slave terminals among the n slave terminals, disconnecting the k slave terminals from the basic network, and forming a third sub-network that includes a master and a slave, the master being a slave terminal of which the priority is highest among the k slave terminals, the slave being each remaining slave terminal.

In accordance with the above aspect, if, while the master terminal and the n slave terminals are communicatively connected by the basic network, a leave request requesting a leave from the basic network to perform private communication between k slave terminals is acquired, the k slave terminals are disconnected from the basic network to form a third sub-network. This enables the users of the k slave terminals to converse with each other by use of the third sub-network, and prevents the conversation from being heard by a third party.

In another possible implementation of the above aspect, the communication control method further includes, in response to detecting the end of a conversation state between the k slave terminals, disconnecting the k slave terminals from the third sub-network, and connecting each of the k slave terminals to the master terminal on the basic network again as a slave.

In accordance with the above aspect, when a conversation between the k slave terminals ends, the k slave terminals are disconnected from the third sub-network, and the k slave terminals are each connected again as a slave to the master terminal on the basic network. This configuration enables the master terminal and the n slave terminals to be communicatively connected by the basic network without necessitating the user to make troublesome settings, such as selecting which terminal as a master and which terminal as a slave.

In another possible implementation of the above aspect, the communication control method further includes, while the master terminal and the n slave terminals are communicatively connected by the basic network;

receiving a master right request from one slave terminal among the n slave terminals, the master right request being made by the one slave terminal to request master right transfer;

transmitting a master-right-transfer approval request to the master terminal, the master-right-transfer approval request being a request to confirm with the master terminal whether the master terminal approves master right transfer; and in response to receiving, from the master terminal as a response to the master-right-transfer approval request, a transfer approval that approves the master right request, switching the approved slave terminal to a master and switching the master terminal to a slave.

In accordance with the above aspect, if the user of a given slave terminal transmits a master right request, and the master right request is approved by the user of the master terminal, the slave terminal is switched to a master, and the master terminal is switched to a slave. Consequently, if a situation arises in which the user of a given slave terminal is to converse with other users with this user acting as the center, the network can be changed flexibly to adapt to such a situation.

In another possible implementation of the above aspect, the communication control method further includes, while the master terminal and the n slave terminals are communicatively connected by the basic network;

receiving a master right transfer request from the master terminal, the master right transfer request being a request made by the master terminal to request master right transfer to one slave terminal among the n slave terminals;

transmitting a master-right-acceptance approval request to the one slave terminal, the master-right-acceptance approval request being a request to confirm with the one slave terminal whether the one slave terminal accepts the master right transfer; and in response to receiving, from the one slave terminal as a response to the master-right-acceptance approval request, an acceptance approval to accept the master right transfer request, switching the one slave terminal that has transmitted the acceptance approval to a master and switching the master terminal to a slave.

In accordance with the above aspect, the user of the master terminal is able, if the user so wishes, to transfer the master right to another user. This allows the network to be flexibly changed to adapt to the needs of the user of the master terminal.

In another possible implementation of the above aspect, the communication control method further includes, in response to detecting that the first slave terminal, and j (j is an integer not less than 1 and not more than (n-m-2)) second slave terminals among the (n-m-1) second slave terminals are in a conversation state on the second sub-network, disconnecting the first slave terminal and the j second slave terminals from the second sub-network, and forming a fourth sub-network, the fourth sub-network including the first slave terminal as a master and each of the j second slave terminals as a slave.

In accordance with the above aspect, if the first slave terminal designated as a master, and j second slave terminals enter into a conversation state on the second sub-network, the master terminal and the m slave terminals are disconnected from the second sub-network, and a fourth sub-network is formed. This enables the network to be configured such that only the user of the first slave terminal and the users of the j second slave terminals are able to converse with each other.

In another possible implementation of the above aspect, the communication control method further includes, if the number of (n-m-1-j) second slave terminals corresponding to the number of second slave terminals that are not in the conversation state is two or more, disconnecting the (n-m-1-j) second slave terminals from the second sub-network, and forming a fifth sub-network that includes a master and a slave, the master being a second slave terminal of which the priority is highest among the (n-m-1-j) second slave terminals, the slave being each of remaining (n-m-2-j) second slave terminals.

In accordance with the above aspect, if the number of (n-m-1-j) slave terminals, which corresponds to the number of slave terminals not in a conversation state, is two or more, these slave terminals are disconnected from the second sub-network, and a fifth sub-network is formed. This makes it possible to prevent a situation where the users of the (n-m-1-j) slave terminals not in a conversation state are unable to converse with each other, thus allowing for effective utilization of communication resources.

The above-mentioned operational effects of the communication control method can be similarly attained with a communication controller that constitutes a communication system, a telepresence robot, and a computer program that causes a computer to execute the communication control method. This computer program may be distributed via a non-transitory computer-readable recording medium such as a CD-ROM, or a communication network such as the Internet.

Embodiments described below each represent one specific implementation of the present disclosure. Specific details set forth in the following description of embodiments, such as numeric values, shapes, components, steps, and the order of steps, are for illustrative purposes only and not intended to limit the scope of the present disclosure. Those components in the following description of embodiments which are not cited in the independent Claim representing the most generic concept of the present disclosure will be described as optional components. For all the embodiments below, the features of the embodiments may be combined.

Embodiment 1

Figure 2:
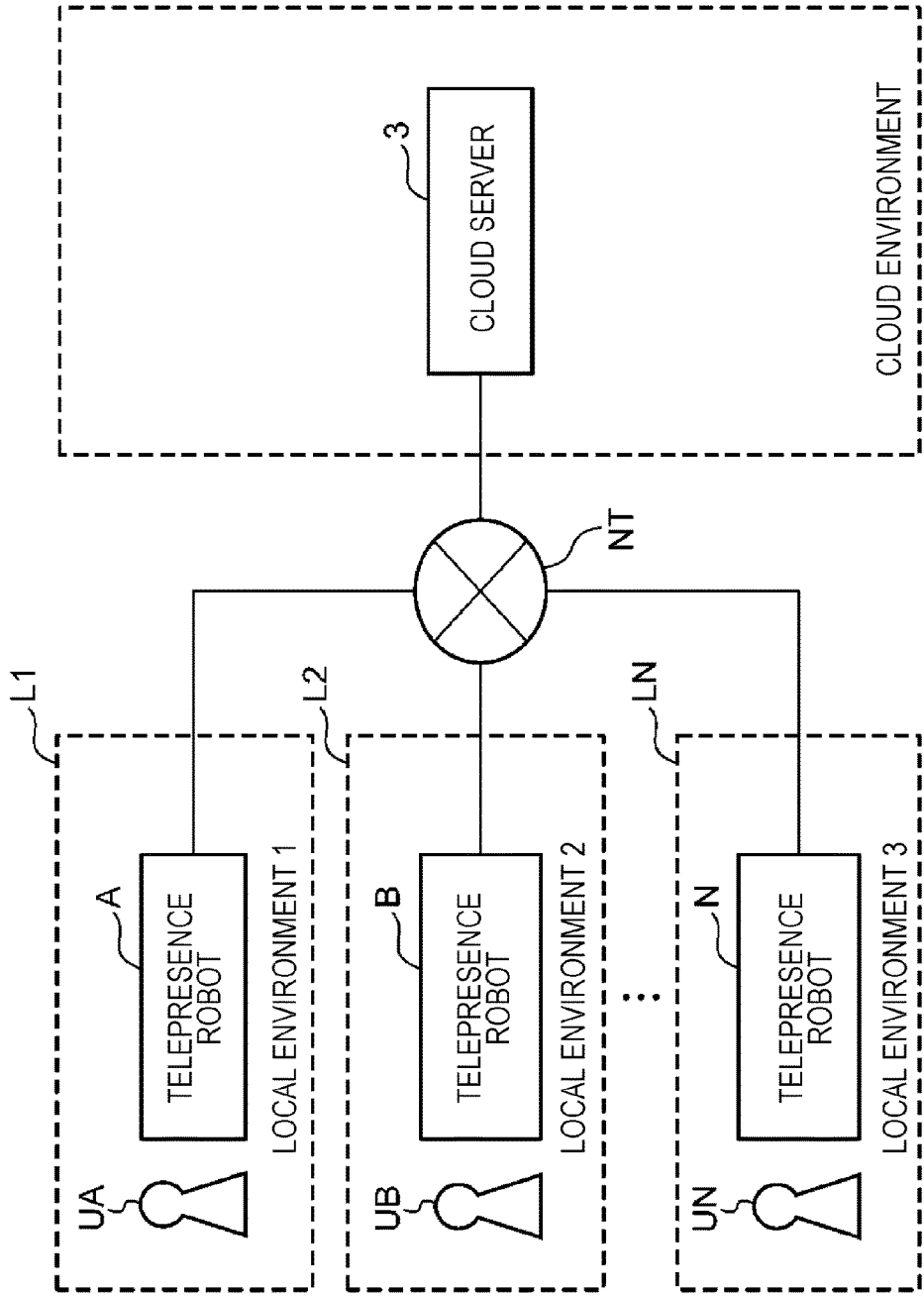
FIG. 2 illustrates an exemplary overall configuration of a communication system according to Embodiment 1 of the present disclosure.

FIG. 2 illustrates an exemplary overall configuration of a communication system according to Embodiment 1 of the present disclosure. The communication system illustrated in FIG. 2 includes a plurality of telepresence robots A to N (to be also referred to as telepresence robots 1 hereinafter), and a cloud server 3.

Each of the telepresence robots A to N is an autonomous mobile robot incorporating technologies such as video conferencing and remote manipulation.

Conversation between a communication source user and a communication target user is conducted via a telepresence robot placed in the local environment where each of these users is present.

For example, the telepresence robot of the communication source user is able to transmit a message to the telepresence robot of the communication target user, or receive a message from the telepresence robot of the communication target user.

The telepresence robot A represents an example of one master terminal. The telepresence robots B to N represent an example of a plurality of slave terminals. The number of slave terminals may be n (n is an integer not less than 2). The telepresence robots B to N will be described below as an example of a plurality of slave terminals. Communication is established between the telepresence robots A to N by a one-to-many connection with the telepresence robot A acting as a mater and the telepresence robots B to N acting as slaves. The telepresence robots A to N are each assigned a priority in advance. For example, it is assumed that the telepresence robot A has the highest priority among the telepresence robots A to N.

For the communication system according to Embodiment 1, a one-to-many connection network centered on a master telepresence robot, with the master being the telepresence robot with the highest priority among a plurality of telepresence robots and the slaves being the remaining telepresence robots, will be referred to as basic network. A master terminal represents a telepresence robot designated as a master, and slave terminals represent telepresence robots designated as slaves or telepresence robots other than the telepresence robot designated as a master.

More specifically, provided that the telepresence robots A to N correspond to such a plurality of telepresence robots, a one-to-many connection network centered on the telepresence robot A will be referred to as basic network. On the basic network, each of the telepresence robots B to N connects to the telepresence robot A.

With the communication system according to Embodiment 1, when at least two of the telepresence robots A to N enter into a conversation state, these telepresence robots are disconnected from the basic network to form a sub-network. Then, the communication system according to Embodiment 1 forms a sub-network in which one of the at least two telepresence robots disconnected from the basic network is designated as a master, with the remainder designated as slaves.

When the conversation state between the at least two telepresence robots ends, the communication system according to Embodiment 1 disconnects the at least two telepresence robots from the sub-network, and connects the two telepresence robots to the basic network again.

For example, if the at least two telepresence robots disconnected from the basic network are both slave terminals, the basic network is formed again by communicatively connecting each of the two telepresence robots again to the telepresence robot A, which is the master terminal on the basic network.

For example, if one of the at least two telepresence robots disconnected from the basic network is the telepresence robot A, the basic network is formed again by communicatively connecting each of the slave terminals B to N to the telepresence robot A.

The following description of Embodiment 1 will be directed to an exemplary case in which one of the at least two telepresence robots disconnected from the basic network is a telepresence robot designated as a master.

The cloud server 3 includes, for example, a processor, a memory, a communication device, and an external storage. The cloud server 3 is connected to a plurality of telepresence robots A to N via a wired or wireless network NT in a manner that allows communication with the telepresence robots A to N. As the network NT, a WAN such as the Internet communication network may be employed. The cloud server 3 represents an example of a communication controller that controls communication between the plurality of telepresence robots A to N. The communication controller is not particularly limited to the cloud server 3 but may be implemented by a communication terminal such as a smart phone, a tablet, or a personal computer, or may be implemented by the telepresence robot 1.

In the example illustrated in FIG. 2, the telepresence robots A to N are respectively placed in different local environments L1 to LN. The locations P1 to P4 as illustrated in FIG. 1 may be employed as the local environments L1 to LN. Users UA to UN are respectively present in the local environments L1 to LN. The following description assumes that the users UA to UN respectively use the telepresence robots A to N. That is, the users UA to UN are respectively associated with the telepresence robots A to N in advance. The cloud server 3 is placed in a cloud environment remote from the local environments L1 to LN.

Figure 3:
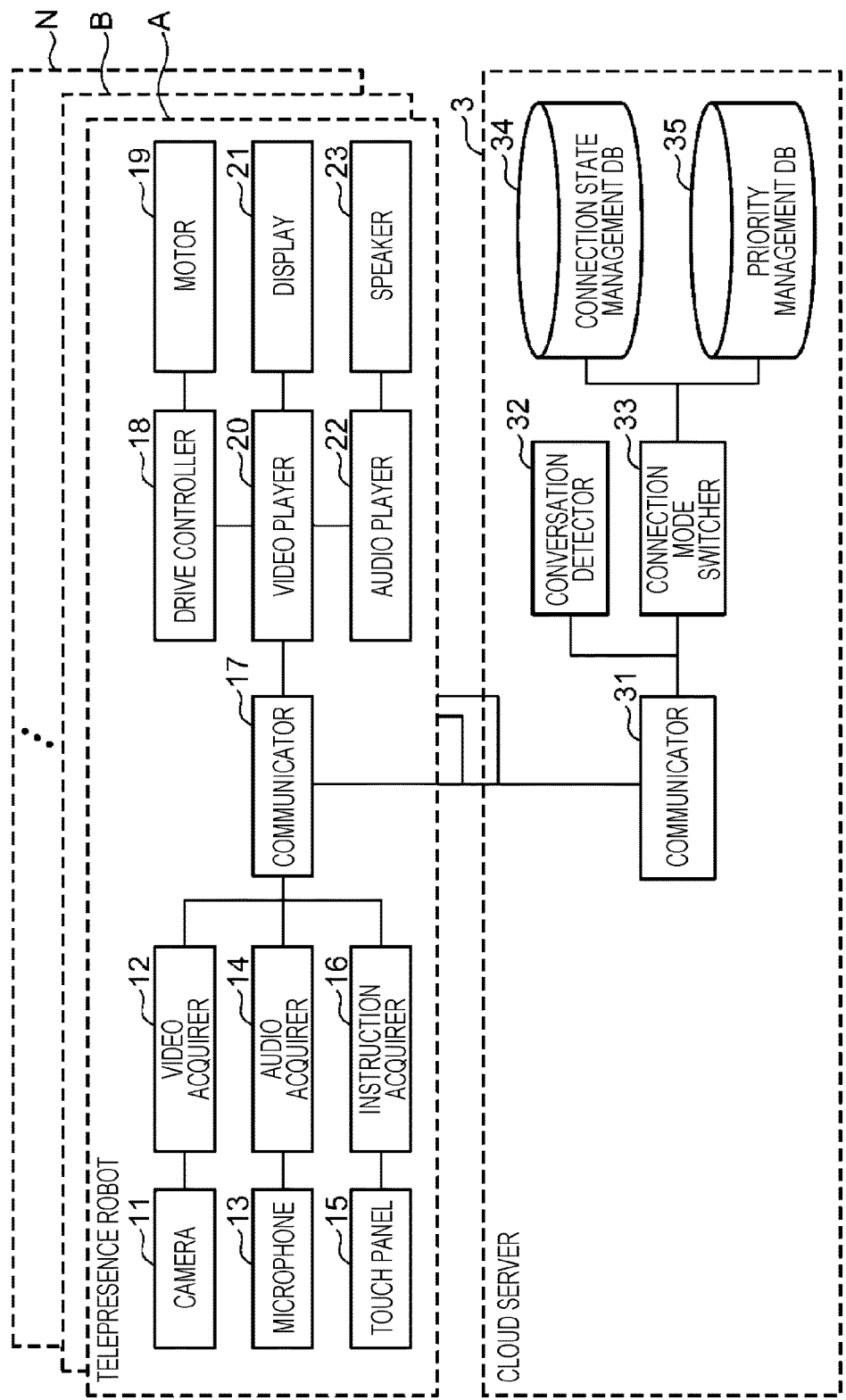
FIG. 3 is a block diagram illustrating a detailed configuration of the communication system illustrated in FIG. 2.

FIG. 3 is a block diagram illustrating a detailed configuration of the communication system illustrated in FIG. 2. The telepresence robot A includes a camera 11, a video acquirer 12, a microphone 13, an audio acquirer 14, a touch panel 15, an instruction acquirer 16, a communicator 17, a drive controller 18, a motor 19, a video player 20, a display 21, an audio player 22, and a speaker 23. For example, the telepresence robot A includes a processor such as a central processing unit (CPU) (not illustrated), a communication circuit (not illustrated), and a memory storing a program (not illustrated). For example, execution of the program by the processor of the telepresence robot 1 causes the video acquirer 12, the audio acquirer 14, the instruction acquirer 16, the drive controller 18, the video player 20, and the audio player 22 to function. Further, the processor executes the program to control the communication circuit, thus causing the communicator 17 to function. Alternatively, the function of each of the video acquirer 12, the audio acquirer 14, the instruction acquirer 16, the drive controller 18, the video player 20, and the audio player 22 may be implemented by using an integrated circuit. The telepresence robots B, C, . . . N are identical in configuration to the telepresence robot A, and thus will not be herein described in further detail.

The cloud server 3 includes a communicator 31, a conversation detector 32, a connection mode switcher 33, a connection state management database (DB) 34, and a priority management DB 35. For example, the cloud server 3 includes a processor such as a central processing unit (CPU) (not illustrated), a communication circuit (not illustrated), and a memory (not illustrated) storing a program. For example, execution of the program by the processor of the cloud server 3 causes the conversation detector 32 and the connection mode switcher 33 to function. Further, the processor executes the program to control the communication circuit, thus causing the communicator 31 to function. Alternatively, the function of each of the conversation detector 32 and the connection mode switcher 33 may be implemented by using an integrated circuit.

The camera 11 of the telepresence robot A is implemented by, for example, an omnidirectional camera capable of acquiring omnidirectional images. The camera 11 constantly captures an image of a telepresence operation target user located near the telepresence robot 1 and to whom a telepresence operation is directed, and outputs the captured image data to the video acquirer 12. The operation of the camera 11 of each of the telepresence robots B to N is the same as the operation of the camera 11 of the telepresence robot A, and thus will not be herein described.

The video acquirer 12 of the telepresence robot A outputs the image data representing the captured image of the telepresence operation target user to the communicator 17. The communicator 17 of the telepresence robot A transmits the image data representing the captured image of the telepresence operation target user to the cloud server 3. The communicator 17 associates the image data output from the video acquirer 12 with a robot identifier (ID) used to identify the telepresence robot 1, and transmits the image data and the robot ID to the cloud server 3. The operation of the video acquirer 12 of each of the telepresence robots B to N is the same as the operation of the video acquirer 12 of the telepresence robot A, and thus will not be herein described.

The microphone 13 of the telepresence robot A is made up of, for example, two or more non-directional microphones. The microphone 13 captures the audio of the voice of a telepresence operation target user constantly or at predetermined intervals of time, and outputs the captured audio data to the audio acquirer 14. The operation of the microphone 13 of each of the telepresence robots B to N is the same as the operation of the microphone 13 of the telepresence robot A, and thus will not be herein described.

The audio acquirer 14 of telepresence robot A outputs audio data representing the captured audio of the voice of the telepresence operation target user to the communicator 17. The communicator 17 associates the audio data of the telepresence operation target user acquired by the audio acquirer 14 with a robot ID, and outputs the audio data and the robot ID to the cloud server 3. The operation of the audio acquirer 14 of each of the telepresence robots B to N is the same as the operation of the audio acquirer 14 of the telepresence robot A, and thus will not be herein described.

The touch panel 15 of the telepresence robot A is used to perform operations such as displaying various messages to a user, or receiving an instruction from a user. The instruction acquirer 16 of the telepresence robot A acquires various user instructions input via the touch panel 15. The operations of the touch panel 15 and instruction acquirer 16 of each of the telepresence robots B to N are the same as the operations of the touch panel 15 and instruction acquirer 16 of the telepresence robot A, and thus will not be herein described in further detail.

The communicator 17 of the telepresence robot A is implemented by a communication device used to connect the telepresence robot A to the network NT. The drive controller 18 of the telepresence robot A controls the motor 19 of the telepresence robot A to thereby move the telepresence robot A.

The motor 19 of the telepresence robot A drives a driving wheel (not illustrated) under control by the drive controller 18 to thereby move or stop the telepresence robot A. The drive controller 18 and the motor 19 each correspond to an example of an autonomous mover that causes the telepresence robot A to move autonomously. The operations of the communicator 17, drive controller 18, and motor 19 of each of the telepresence robots B to N are the same as the operations of the communicator 17, drive controller 18, and motor 19 of the telepresence robot A, and thus will not be herein described in further detail.

The video player 20 of the telepresence robot A outputs, to the display 21, a video signal representing playback of the video data of a communication source user, which is acquired from the cloud server 3 via the communicator 17. A communication source user in this case refers to, for example, a user who uses a telepresence robot that connects to the telepresence robot A. The display 21 of the telepresence robot A displays video or other information of the communication source user. The video player 20 and the display 21 of the telepresence robot A each correspond to an example of a presenter. The operations of the video player 20 and display 21 of each of the telepresence robots B to N are the same as the operations of the video player 20 and display 21 of the telepresence robot A, and thus will not be herein described in further detail.

The audio player 22 of the telepresence robot A outputs, to the speaker 23 of the telepresence robot A, an audio signal representing playback of audio data or other data of a communication source user, which is acquired from the cloud server 3 via the communicator 17. The speaker 23 plays back the audio data or other data of the communication source user. The audio player 22 and the speaker 23 each correspond to an example of a presenter. The operations of the audio player 22 and speaker 23 of each of the telepresence robots B to N are the same as the operations of the audio player 22 and speaker 23 of the telepresence robot A, and thus will not be herein described in further detail.

The communicator 31 of the cloud server 3 communicates with the plurality of telepresence robots A to N.

The conversation detector 32 detects whether the telepresence robot A corresponding to a master terminal, and m (m is an integer not less than 1 and not more than n-1) telepresence robots among the telepresence robots B to N, which correspond to a plurality of slave terminals, are in a conversation state. A conversation state refers to, for example, a state in which the user of the telepresence robot A, and the user of a specific telepresence robot (e.g., the telepresence robot B) among the telepresence robots B to N are having a conversation.

The conversation detector 32 may detect a conversation state as follows. For example, the conversation detector 32 may determine that the telepresence robot A and the telepresence robot B are in a conversation state if detection of the end of an utterance made by the user UA of the telepresence robot A is followed, within a predetermined period of time, by detection of an utterance made by the user UB of the telepresence robot B. Alternatively, the conversation detector 32 may determine that the telepresence robot A and the telepresence robot B are in a conversation state if the following sequence of events is repeated successively a predetermined number of times or more: detecting the end of an utterance made by the user UA of the telepresence robot A, followed by detection of an utterance made by the user UB of the telepresence robot B within a predetermined period of time, followed by detection of the end of the utterance made by the user UB, followed by detection of an utterance of the user UA within a predetermined period of time.

The predetermined number of times may be any integer number of times greater than one, such as once, twice, or three times. The predetermined period of time may be any predetermined period of time (e.g., 0.5 seconds, 1 second, or 5 seconds) it is assumed to take, when users are exchanging utterances, from the end of an utterance produced by a given user to the production of an utterance by another user.

Although the following description of Embodiment 1 assumes for the simplicity of explanation that the conversation detector 32 detects a conversation state between two telepresence robots 1, this is not intended to limit the present disclosure. The conversation detector 32 may detect a conversation state between three or more telepresence robots 1.

This is explained below for an exemplary case in which the users UA, UB, and UC are present. In this case, the conversation detector 32 may determine that the telepresence robots A, B, and C are in a conversation state if the conversation detector 32 detects that the users UA, UB, and UC are successively producing utterances at intervals less than or equal to a predetermined period of time, such as when the conversation detector 32 detects the end of an utterance made by the user UA, followed by detection of an utterance of the user UB with a predetermined period of time, followed by detection of the end of the utterance made by the user UB, followed by detection an utterance of the user UC within a predetermined period of time.

In another possible configuration, if the conversation detector 32 detects an input, from the user of one of a plurality of telepresence robots, of a private communication request that specifies one or more specific users as targets and requests private communication between the telepresence robots used by these users, the conversation detector 32 determines that the telepresence robot of the one user and the telepresence robots of the one or more specific users are in a conversation state.

Specifically, for example, if the communicator 31 receives, from the user UA of the telepresence robot A, a private communication request that specifies the user UB and the user UC as targets and requests private communication between the telepresence robots A to C used by these users, the communicator 31 outputs the private communication request to the conversation detector 32. The conversation detector 32 may, upon receiving such a private communication request, detect that the private communication request has been input, and determine that the telepresence robot A, the telepresence robot B, and the telepresence robot C are in a conversation state. The conversation detector 32 may output the robot ID of each telepresence robot determined to be in a conversation state to the connection mode switcher 33.

For example, in response to detection of a conversation state between the telepresence robot A and, for example, the telepresence robot B, the connection mode switcher 33 disconnects the telepresence robot A and the telepresence robot B from the basic network, and forms a sub-network (first sub-network) with the telepresence robot A as a master and the telepresence robot B as a slave.

Further, if, among the telepresence robots B to N, the number of telepresence robots not in a conversation state with the telepresence robot A is two or more, that is, if there are a plurality of such telepresence robots, the connection mode switcher 33 disconnects these telepresence robots from the basic network, and forms a sub-network (second sub-network) in which the telepresence robot with the highest priority among the disconnected telepresence robots is designated as a master and each remaining telepresence robot is designated as a slave.

For example, if, among the telepresence robots B to N designated as slaves, there are two or more telepresence robots not in a conversation state with the telepresence robot A, the connection mode switcher 33 disconnects these telepresence robots from the basic network, and forms a sub-network in which the telepresence robot with the highest priority among the two or more disconnected telepresence robots is designated as a master and each remaining telepresence robot is designated as a slave.

A case is considered in which telepresence robots not in a conversation state with the telepresence robot A are telepresence robots C to N. In this case, there are two or more telepresence robots not in a conversation state with the telepresence robot A. Accordingly, the connection mode switcher 33 disconnects the telepresence robots C to N from the basic network.

For example, if the telepresence robot with the highest priority among the telepresence robots C to N is the telepresence robot C, the connection mode switcher 33 forms a sub-network with the telepresence robot C designated as a master and the remaining telepresence robots D to N designated as slaves.

If the end of a conversation state between the telepresence robot A and the telepresence robot B is detected, the connection mode switcher 33 disconnects the telepresence robot A and the telepresence robot B from the first sub-network, and also disconnects the telepresence robots C to N from the second sub-network. Then, the connection mode switcher 33 forms the basic network again in which the telepresence robot A, which has the highest priority among the telepresence robots A to N, is designated as a master and the remaining telepresence robots B to N are designated as slaves. This means that the communication connection between the telepresence robots A to N returns to the basic network representing a one-to-many connection centered on the telepresence robot A. This enables the connection mode to return to the basic network once the end of a conversation state is detected, without necessitating the user to make settings such as selecting which telepresence robot 1 as a master and which robot as a slave.

Figure 5:
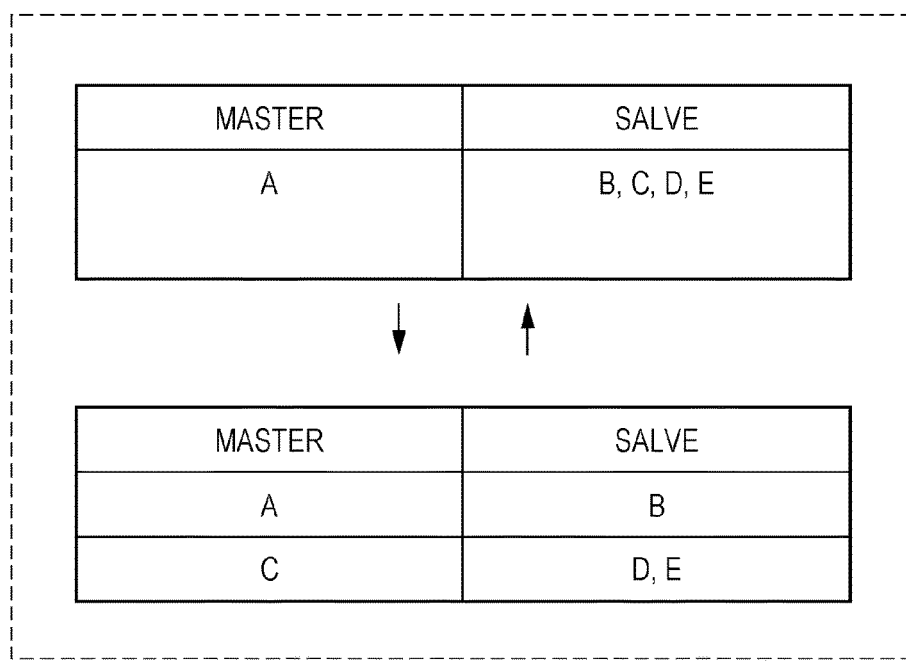
FIG. 5 illustrates an exemplary data structure of a connection state management DB.

The connection state management DB 34, which is implemented by, for example, a non-volatile memory, is a database for managing the connection state of each telepresence robot. FIG. 5 illustrates an exemplary data structure of the connection state management DB 34. FIG. 5 illustrates data constituting the connection state management DB 34 in the form of tables.

The upper table in FIG. 5 illustrates an exemplary connection state when telepresence robots A to E are connected via a basic network.

The lower table in FIG. 5 illustrates an exemplary data structure of the connection state management DB 34 with the basic network separated into a plurality of sub-networks.

The connection state management DB 34 includes a "Master" field and a "Slave" field as described above. The "Master" field registers the robot ID of a telepresence robot currently designated as a master. The "Slave" field registers the robot ID of each telepresence robot currently designated as a slave. A robot ID refers to an identifier uniquely assigned to each of the telepresence robots A to N. In the example illustrated in FIG. 5, there are five telepresence robots A to E, and robot IDs "A" to "E" are respectively assigned to the telepresence robots A to E.

In the upper table in FIG. 5, the telepresence robot A as a master, and the telepresence robots B to E as slaves are stored in association with each other. Thus, a basic network centered on the telepresence robot A is formed. Now, it is assumed that a conversation state between the telepresence robot A and the telepresence robot B is detected. In this case, the connection mode switcher 33 rewrites the connection state management DB 34 such that the upper table illustrated in FIG. 5 changes to the lower table illustrated in FIG. 5.

In the lower table in FIG. 5, the robot ID of the telepresence robot A acting as a master and the robot ID of the telepresence robot B acting as a slave are stored in association with each other, and the robot ID of the telepresence robot C acting as a master and the robot IDs of the telepresence robots D and E acting as slaves are stored in association with each other. It is thus appreciated that the basic network BN has been separated into a sub-network in which the telepresence robot A acts as a master and the telepresence robot B acts as a slave, and a sub-network in which the telepresence robot C acts as a master and the telepresence robots D and E act as slaves. The sub-network with the telepresence robot A acting as a master and the telepresence robot B acting as a slave represents an example of a first sub-network. Further, the sub-network with the telepresence robot C acting as a master and the telepresence robots D and E acting as slaves represents an example of a second sub-network.

When the conversation state between the telepresence robot A and the telepresence robot B ends, the connection mode switcher 33 disconnects the telepresence robot A and the telepresence robot B from the first sub-network, and disconnects the telepresence robots C to E from the second sub-network. After the connection mode switcher 33 forms the basic network with the telepresence robot A as a master and the telepresence robots B to E as slaves, the connection state management DB 34 rewrites the connection state management DB 34 such that the lower table illustrated in FIG. 5 changes to the upper table illustrated in FIG. 5. 5.

If, for example, the telepresence robots C to E are in a conversation state when the conversation state between the telepresence robot A and the telepresence robot B ends, the connection mode switcher 33 may, after the conversation state between the telepresence robots C to E ends, disconnect the telepresence robots C to E from the second sub-network, and then form the basic network in which the telepresence robot A acts as a master and the telepresence robots B to E act as slaves.

As a result, the fact that the two previously separated sub-networks have been returned to the basic network BN is reflected on the connection state management DB 34.

As described above, the connection mode switcher 33 rewrites the connection state management DB 34 whenever necessary to thereby manage the connection state of each of the telepresence robots A to E.

Reference now returns to FIG. 3. The priority management DB 35, which is implemented by, for example, a non-volatile memory, manages a priority determined in advance for each of the telepresence robots A to N.

Figure 4:
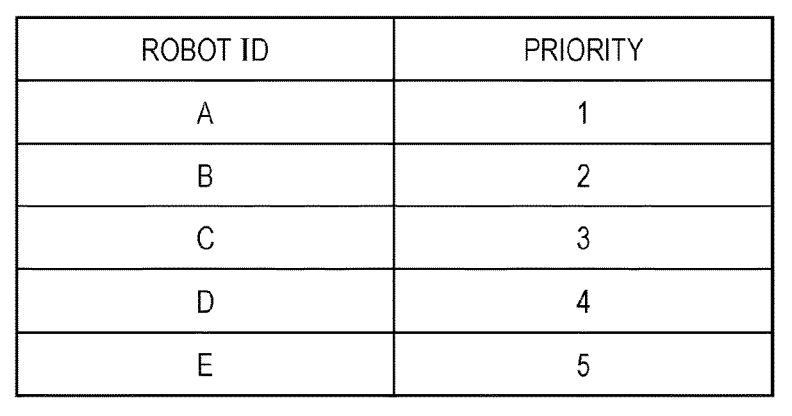

FIG. 4 illustrates an exemplary data structure of the priority management DB 35. FIG. 4 illustrates data constituting the priority management DB 35 in the form of a table. The priority management DB 35 includes a "Robot ID" field and a "Priority" field. The "Robot ID" is the same as the "Robot ID" illustrated in FIG. 5. The "Priority" field registers a priority assigned to each telepresence robot 1 in advance. A lower priority value indicates a higher priority.

In the example illustrated in FIG. 4, a priority "1" is assigned to the telepresence robot A acting as a master, meaning that the highest priority is assigned to the telepresence robot A. Priorities "2" to "5" are respectively assigned to the telepresence robots B to E, meaning that priorities are assigned in descending order from the telepresence robots B to E. When forming a sub-network, the connection mode switcher 33 refers to the priority management DB 35 to determine a master for the sub-network.

Figure 6:
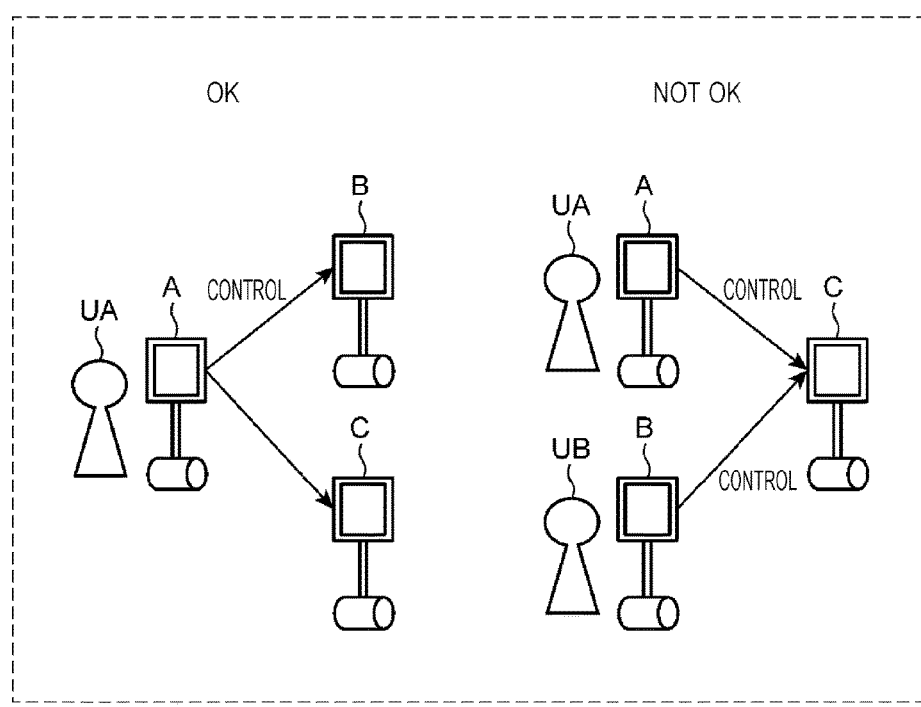
FIG. 6 illustrates a mode of control that forms the basis of the communication system according to Embodiment 1 of the present disclosure.

FIG. 6 illustrates a mode of control that forms the basis of the communication system according to Embodiment 1 of the present disclosure. As illustrated in the left diagram of FIG. 6, it is assumed that the telepresence robot A acting as a master terminal has a right to control the telepresence robots B and C acting as slaves. This right is atomic in nature, meaning that the right can be neither divided nor distributed. For example, as illustrated in the right diagram of FIG. 6, it is not possible for a plurality of telepresence robots, the telepresence robots A and B, to act as masters to simultaneously control one telepresence robot C. As described above, a master-slave relationship is defined between telepresence robots. Among a plurality of telepresence robots connecting to the basic network BN or a sub-network, there is at most only one telepresence robot that can become a master. In this regard, examples of the above-mentioned control include moving or stopping of a slave telepresence robot by a master telepresence robot.

Figure 7:
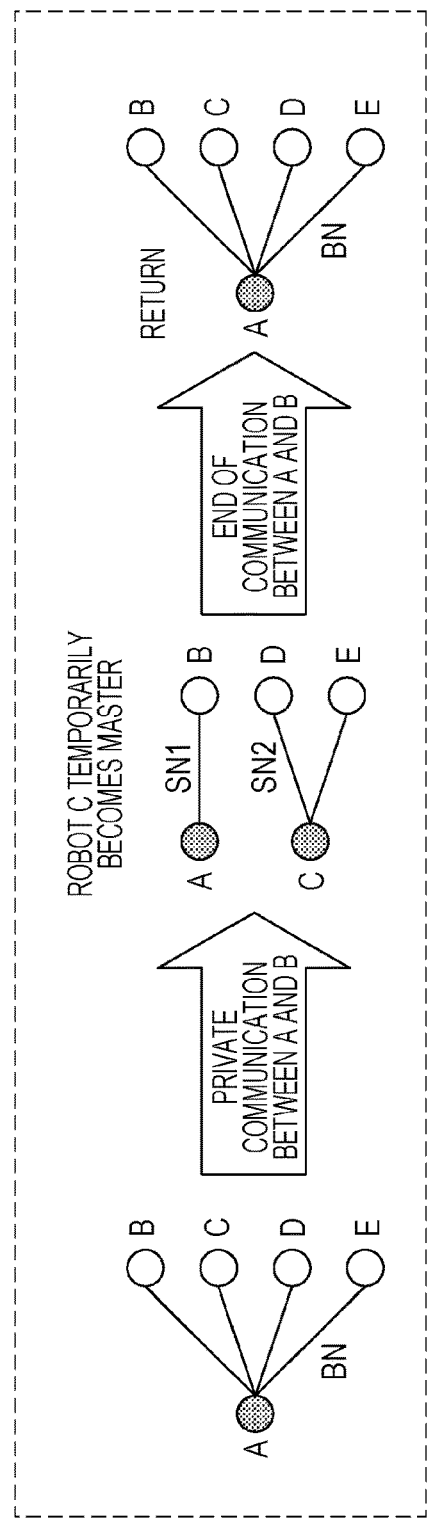
FIG. 7 illustrates an overview of a process performed by the communication system according to Embodiment 1 of the present disclosure.

FIG. 7 illustrates an overview of a process performed by the communication system according to Embodiment 1 of the present disclosure. In the left diagram of FIG. 7, a basic network BN is formed with the telepresence robot A designated as a master and the telepresence robots B to E designated as slaves. In this state, it is assumed that the conversation detector 32 detects that the telepresence robot A and the telepresence robot B are in a conversation state. Then, as illustrated in the middle diagram of FIG. 7, the connection mode switcher 33 temporarily forms a sub-network SN1 (an example of a first sub-network) with the telepresence robot A designated as a master and the telepresence robot B designated as a slave, and at the same time, the connection mode switcher 33 temporarily forms a sub-network SN2 (an example of a second sub-network) with the telepresence robot C designated as a master and the telepresence robots D and E designated as slaves. The reason why the telepresence robot C becomes a master on the sub-network SN2 is because, as illustrated in FIG. 4, the telepresence robot C has the highest priority among the telepresence robots C to E. When the conversation state between the telepresence robot A and the telepresence robot B ends, the connection mode switcher 33 disconnects the telepresence robots A and B from the sub-network SN1, and also disconnects the telepresence robots C, D, and E from the sub-network SN2. Then, the connection mode switcher 33 forms the basic network BN again in which the telepresence robot A, which has the highest priority among the telepresence robots A to E, is designated as a master and the remaining telepresence robots B, C, D, and E are designated as slaves. That is, the connection mode switcher 33 returns the connection mode from the sub-networks SN1 and SN2 to the basic network BN. The end of a conversation state is detected by, for example, the user UA inputting a private communication end request requesting the end of a private communication. However, this is only illustrative of one example. Alternatively, the connection mode switcher 33 may detect the end of a conversation between the users UA and UB from the audio data of the users UA and UB to thereby determine that the conversation state between the telepresence robot A and the telepresence robot B has ended. In this case, the connection mode switcher 33 may determine that the conversation state has ended if no utterance of the user UA or the user UB is detected after the elapse of a predetermined period of time following the detection of the end of an utterance made by the user UA or the user UB.

Figure 8:
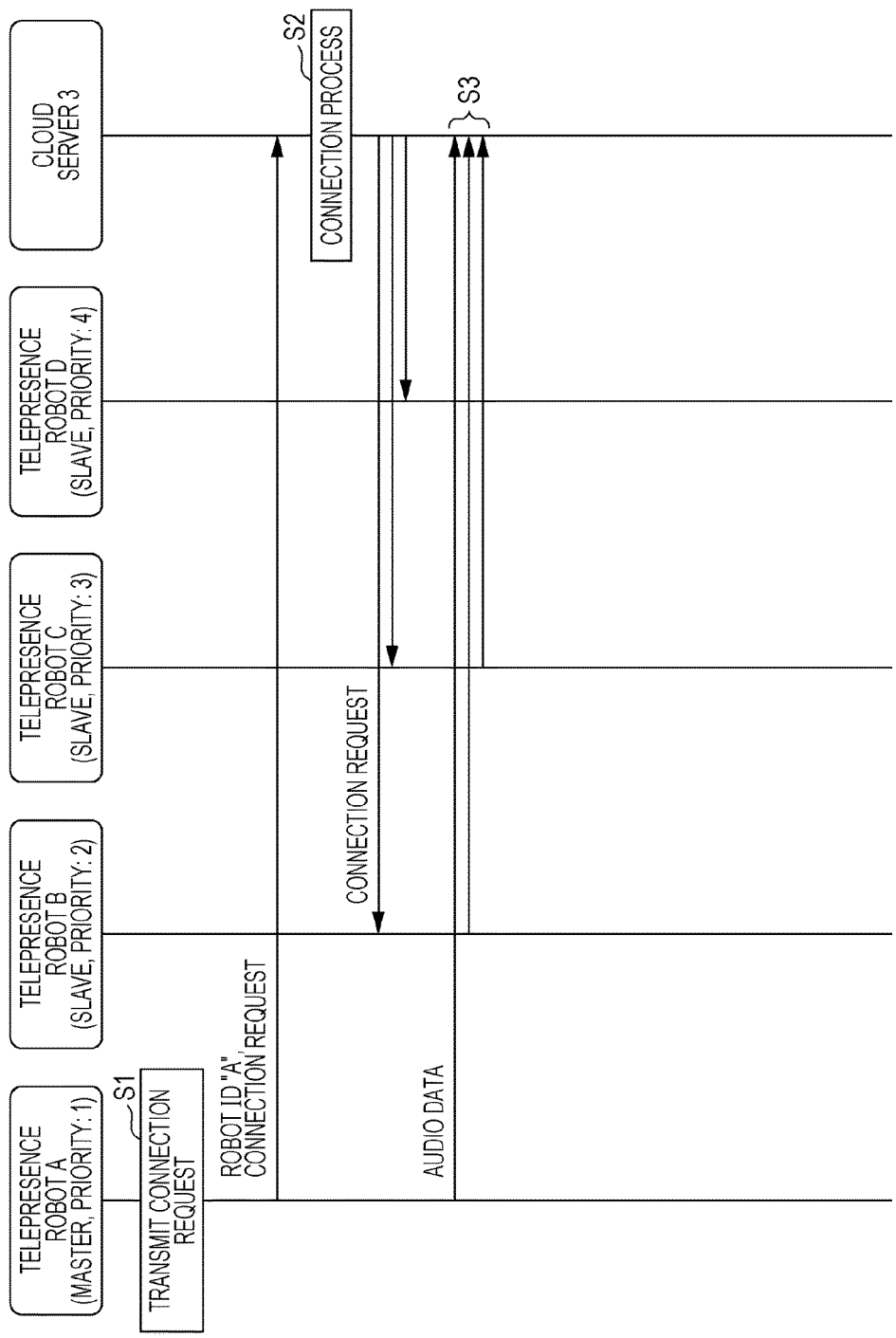
FIG. 8 is a sequence diagram illustrating an exemplary process performed in forming a basic network in the communication system according to Embodiment 1 of the present disclosure.

FIG. 8 is a sequence diagram illustrating an exemplary process performed in forming a basic network BN in the communication system according to Embodiment 1 of the present disclosure. The sequence diagram illustrates an exemplary case in which the basic network BN includes four telepresence robots A to D. It is assumed that the respective priorities of the telepresence robots A to D managed by the priority management DB 35 are in the following order from highest to lowest: the telepresence robot A, the telepresence robot B, the telepresence robot C, and the telepresence robot D. It is also assumed that the telepresence robot A has the master right at the time when the sequence illustrated in FIG. 8 is executed. In this case, the remaining telepresence robots B to D are slaves.

At S1, when the instruction acquirer 16 of the telepresence robot A receives an input of an instruction indicating a connection request from the user UA, the instruction acquirer 16 associates the connection request with the robot ID "A" of the telepresence robot A, and transmits the connection request and the robot ID to the cloud server 3 via the communicator 17. At this time, an instruction indicating a connection request may be input by the user UA by, for example, pressing a connection request button displayed on the touch panel 15 of the telepresence robot A.

At S2, when the communicator 31 of the cloud server 3 receives the connection request, the connection mode switcher 33 refers to the priority management DB 35, and performs a connection process that forms a basic network BN in which the telepresence robot A, which has the highest priority, is designated as a master and the remaining telepresence robots B to D are designated as slaves. The connection process is a process that establishes a communication connection between the telepresence robot A and each of the telepresence robots B to D.

More specifically, at S2, the connection mode switcher 33 transmits, via the communicator 31, a connection request for establishing a communication connection with the telepresence robot A to each of the telepresence robots B to D. The connection request may include, for example, information indicating that the master is the telepresence robot A. For example, when the communicator 17 of the telepresence robot B receives the connection request from the cloud server 3, the communicator 17 establishes a communication connection with the telepresence robot A. The above-mentioned process of establishing a communication connection is also performed in the same manner for the telepresence robots C and D. As a result, a communication connection is established between each of the telepresence robots B to D, and the telepresence robot A. The basic network BN is thus formed with the telepresence robot A as a master and the telepresence robots B, C, and D as slaves. Further, at S2, the connection mode switcher 33 registers the robot ID of the telepresence robot A into the "Master" field in the connection state management DB 34, and registers the robot IDs of the telepresence robots B to D into the "Slave" field.

At S3, the communicator 17 of the telepresence robot A transmits the audio data of the user UA acquired by the audio acquirer 14 to each of the telepresence robots B to D by broadcasting via the cloud server 3. For example, the communicator 17 of the telepresence robot B receives the audio data of the user UA via the cloud server 3. The audio player 22 receives the audio data of the user UA from the communicator 17, and outputs the audio signal of the user UA to the speaker 23. This process is also performed in the same manner for the telepresence robots C and D. An utterance of the user UA is thus delivered to the users UB to UD. In a state in which the basic network BN is formed, the audio data of each of the users UB to UD is transmitted via the cloud server 3 to only the master, that is, the telepresence robot A, and not transmitted to the other slaves, that is, the telepresence robots B to D. The user UA is thus able to converse with the users UB to UD in a one-to-many fashion. At S3 in FIG. 8, video data may be transmitted in addition to audio data.

Figure 9:
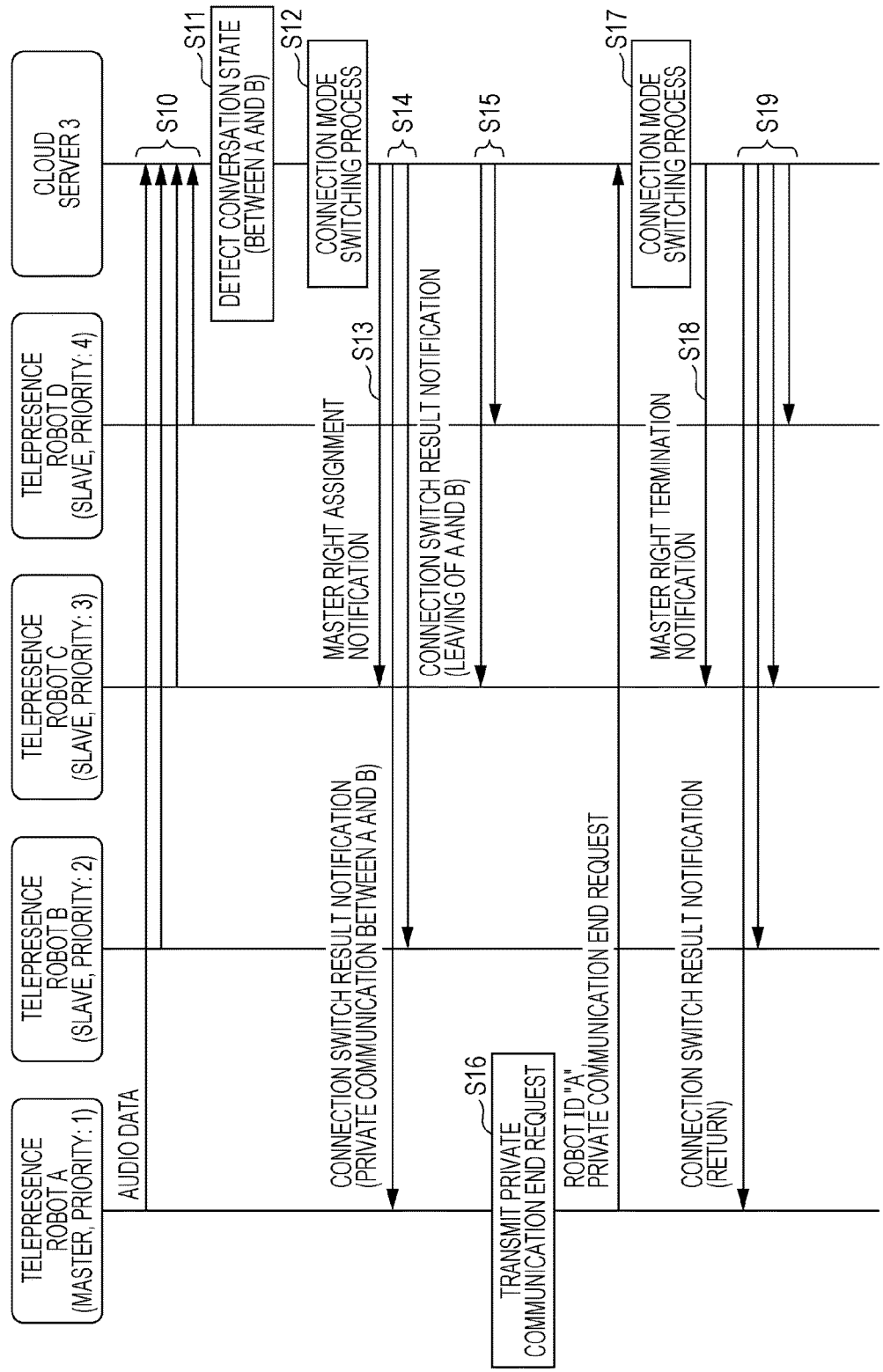
FIG. 9 is a sequence diagram illustrating an exemplary process performed in response to detection of a conversation state in the communication system according to Embodiment 1 of the present disclosure.

FIG. 9 is a sequence diagram illustrating an exemplary process performed in response to detection of a conversation state in the communication system according to Embodiment 1 of the present disclosure.

At S10, when the telepresence robot A acquires audio data of the user UA, the telepresence robot A transmits the acquired audio data to the telepresence robots B to D by broadcasting via the cloud server 3. Further, when the telepresence robots B to D respectively acquire audio data of the users UB to UD, the telepresence robots B to D transmit the acquired audio data to the telepresence robot A via the cloud server 3. At S10, video data may be transmitted in addition to audio data.

At S11, the conversation detector 32 detects that the telepresence robot A and the telepresence robot B are in a conversation state. In the example illustrated in FIG. 9, the conversation detector 32 determines that the telepresence robot A and the telepresence robot B are in a conversation state if, for example, the conversation detector 32 detects an utterance of the user UB within a predetermined period of time after detection of the end of an utterance made by the user UA, and subsequently detects an utterance of the user UA within a predetermined period of time after the end of the utterance made by the user UB.

At S12, the connection mode switcher 33 executes a connection mode switching process. In the connection mode switching process at S12, the connection mode switcher 33 refers to the priority management DB 35, and identifies the telepresence robot C as the telepresence robot that has the highest priority among the telepresence robots C and D other than the telepresence robots A and B whose conversation state has been detected.

Further, the connection mode switcher 33 disconnects the telepresence robots A and B from the basic network BN.

The connection mode switcher 33 transmits a connection request for establishing a communication connection with the telepresence robot A to the telepresence robot B via the communicator 31. When the communicator 31 of the telepresence robot B receives the connection request, the communicator 31 establishes a communication connection with the telepresence robot A. As a result, a sub-network SN1 is formed with the telepresence robot A as a master and the telepresence robot B as a slave.

Further, the connection mode switcher 33 disconnects the telepresence robots C and D from the basic network BN, and transmits a connection request for establishing a communication connection with the telepresence robot C to the telepresence robot D via the communicator 31. Upon receiving the connection request, the telepresence robot D establishes a communication connection with the telepresence robot C. As a result, a sub-network SN2 is formed with the telepresence robot C as a master and the telepresence robot D as a slave.

Then, the connection mode switcher 33 registers the robot ID of the telepresence robot B into the "Slave" field in the connection state management DB 34 in association with the robot ID of the telepresence robot A, and registers the robot ID of the telepresence robot D into the "Slave" field in association with the robot ID of the telepresence robot C. As a result, the fact that the basic network BN has been separated into the sub-network SN1, which is used for private communication between the telepresence robots A and B, and the sub-network SN2, which is used for private communication between the telepresence robots C and D, is reflected on the connection state management DB 34.

At S13, the connection mode switcher 33 transmits a master right assignment notification to the telepresence robot C via the communicator 31.

At S14, the connection mode switcher 33 transmits, to each of the telepresence robots A and B via the communicator 31, a connection switch result notification to notify that the sub-network SN1 for performing private communication between the telepresence robot A and the telepresence robot B has been formed.

At S15, the connection mode switcher 33 transmits, to each of the telepresence robots C and D via the communicator 31, a connection switch result notification to notify that the telepresence robots A and B have been disconnected from the basic network BN.

At S16, when the instruction acquirer 16 of the telepresence robot A receives an input of an instruction indicating a private communication end request from the user UA, the instruction acquirer 16 associates the private communication end request with the robot ID "A" of the telepresence robot A, and transmits the request and the robot ID to the cloud server 3 via the communicator 17. At this time, an instruction indicating a private communication end request may be input by the user UA by, for example, pressing a private communication end request button displayed on the touch panel 15 of the telepresence robot A.

At S17, the communicator 31 of the cloud server 3 receives the private communication end request from the telepresence robot A, and outputs the received request to the connection mode switcher 33. Upon receiving the private communication end request, the connection mode switcher 33 executes a connection mode switching process. In the connection mode switching process at S17, the connection mode switcher 33 disconnects the telepresence robots A and B from the sub-network SN1, and also disconnects the telepresence robots C and D from the sub-network SN2. The connection mode switcher 33 identifies the telepresence robot A, which has the highest priority among the telepresence robots A to D, as a master, and the remaining telepresence robots B to D as slaves. The connection mode switcher 33 transmits a connection request for establishing a communication connection with the telepresence robot A to each of the telepresence robots B to D via the communicator 31. For example, when the communicator 17 of the telepresence robot B receives the connection request from the cloud server 3, the communicator 17 establishes a communication connection with the telepresence robot A. The above-mentioned process of establishing a communication connection is also performed in the same manner for the telepresence robots C and D. As a result, the basic network BN is formed again with the telepresence robot A as a master and the telepresence robots B, C, and D as slaves.

The connection mode switcher 33 registers the robot ID of the telepresence robot A into the "Master" field in the connection state management DB 34, and registers the respective robot IDs of the telepresence robots B, C, and D into the "Slave" field. As a result, the fact that the sub-networks SN1 and SN2 have been returned to the basic network BN is reflected on the connection state management DB 34.

At S18, the connection mode switcher 33 transmits a master right termination notification, which notifies that the master right has terminated, to the telepresence robot C, which is the master of the sub-network SN2, via the communicator 31.

At S19, the connection mode switcher 33 transmits, to each of the telepresence robots A, B, C, and D via the communicator 31, a connection switch result notification to notify that the communication connection has returned to the basic network BN.

Although FIG. 9 is directed to a case in which a conversation state is detected between the telepresence robot A and the telepresence robot B at S11, this is only illustrative of one example. The same process as in FIG. 9 is executed also for a case in which a conversation state is detected between the telepresence robot A and each of the telepresence robots C and D.

Figure 10:
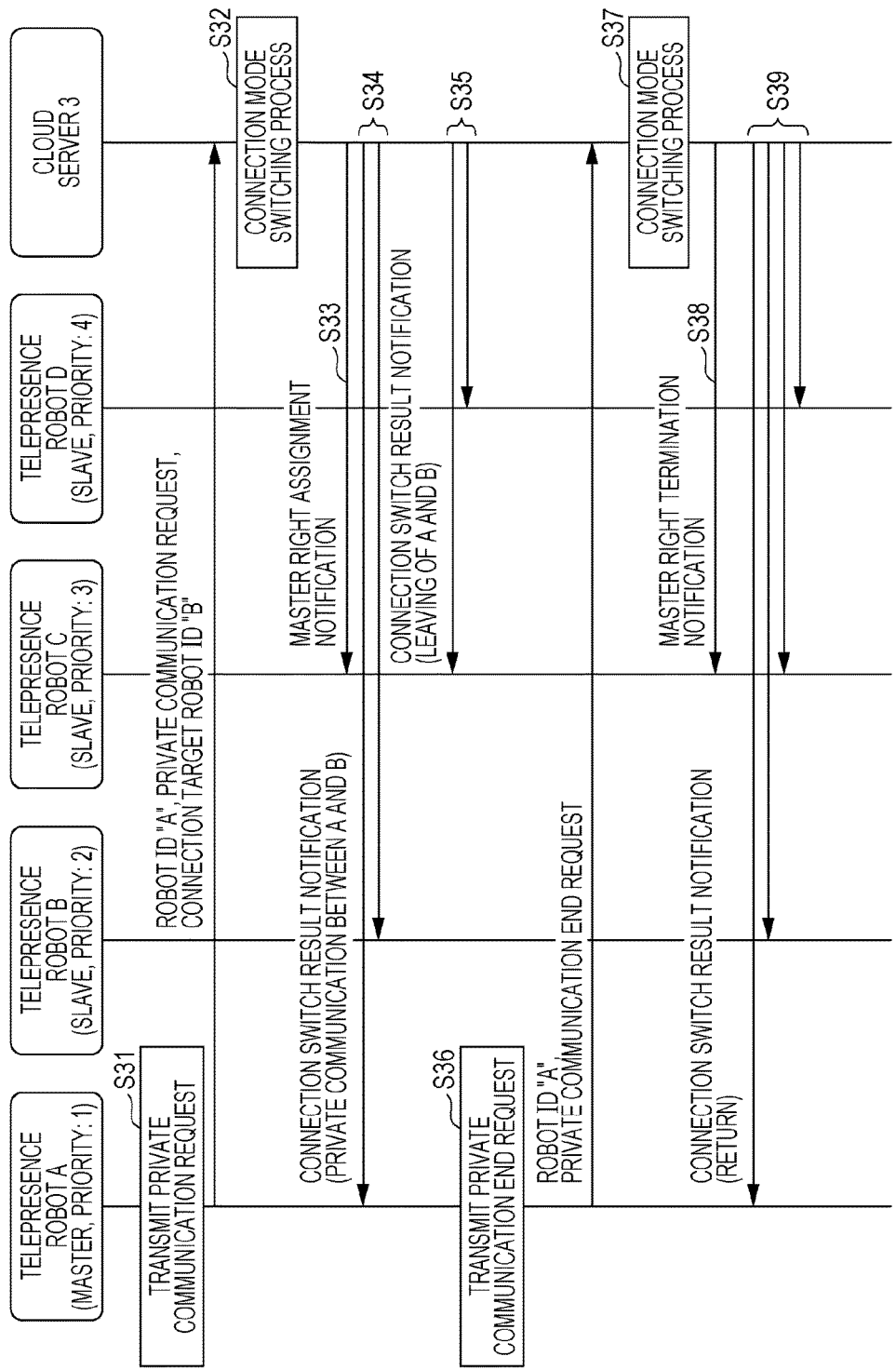
FIG. 10 is a sequence diagram illustrating another exemplary process performed in response to detection of a conversation state in the communication system according to Embodiment 1 of the present disclosure.

The communication system according to Embodiment 1 may employ a sequence illustrated in FIG. 10 instead of the sequence illustrated in FIG. 9.

FIG. 10 is a sequence diagram illustrating another exemplary process performed in response to detection of a conversation state in the communication system according to Embodiment 1 of the present disclosure. In FIG. 9, a conversation state is automatically detected by the cloud server 3. In FIG. 10, the user is made to input a private communication request to allow detection of a conversation state by the cloud server 3.

At S31, when the instruction acquirer 16 of the telepresence robot A receives, from the user UA, an input of an instruction indicating a private communication request that specifies the telepresence robot B as a connection target and requests private communication between the telepresence robot A and the telepresence robot B, the instruction acquirer 16 associates the private communication request with the robot ID "A" of the telepresence robot A and the robot ID "B" of the connection target, and transmits the request and the robot IDs to the cloud server 3 via the communicator 17. In this case, an instruction indicating a private communication request may be input by the user UA by, for example, operating a user selection button displayed on the touch panel 15 to select the telepresence robot B as a communication target, and then pressing a private communication request button. Although the above description is directed to an implementation in which the user UA specifies the telepresence robot B as a connection target, in another possible implementation, the user UA specifies the user UB with whom to have a conversation. This may be accomplished by the telepresence robot A storing the correspondence between the users UB to UD and the telepresence robots B to D in advance.

At S32, when the communicator 31 of the cloud server 3 receives the private communication request, the connection mode switcher 33 executes a connection mode switching process in the same manner as in FIG. 9. The subsequent steps from S32 to S39 are the same as S12 to S19 illustrated in FIG. 9 and thus will not be described.

In FIG. 10, a private communication end request is transmitted by the telepresence robot A that has transmitted a private communication request. Alternatively, such a private communication end request may be transmitted by the telepresence robot B with which the telepresence robot A communicates. This may be accomplished by the user UB inputting an operation of pressing a private communication end request button displayed on the touch panel 15 of the telepresence robot B.

In FIG. 10, the telepresence robot A transmits a private communication request at S31. Alternatively, one of the slave telepresence robots B, C, and D may transmit a private communication request. This may be accomplished by inputting an operation of pressing a private communication request button displayed on the touch panel 15 of the telepresence robot B of the user UB, the touch panel 15 of the telepresence robot C of the user UC, or the touch panel 15 of the telepresence robot D of the user UD.

As described above, with the communication system according to Embodiment 1, if the telepresence robot A and, for example, the telepresence robot B are detected to be in a conversation state, the telepresence robot A and the telepresence robot B are disconnected from the basic network BN, and the sub-network SN1 is formed. This enables the network to be configured such that if a conversation is initiated between the user UA of the telepresence robot A and the user UB of the telepresence robot B, only the users who have initiated the conversation are able to converse with each other.

Further, the telepresence robots C and D, which correspond to a plurality of telepresence robots not in a conversation state with the telepresence robot A, are disconnected from the basic network, and the sub-network SN2 is formed with the master being the telepresence robot C, which has the highest priority between the telepresence robots C and D, and the slave being the remaining telepresence robot D. This configuration ensures that if a conversation is initiated between the user UA and the user UB, the users UC and UD of the telepresence robots C and D not involved in this conversation are also able to have a conversation by use of their own telepresence robots C and D, thus allowing for effective utilization of communication resources.

Further, when the conversation between the user UA and the user UB ends, the communication connection is returned to the basic network BN. This makes it possible to maintain the environment of the basic network BN without necessitating the user to make troublesome settings, such as selecting which telepresence robot 1 as a master and which telepresence robot 1 as a slave.

Modification of Embodiment 1

For example, it is assumed that the sub-network SN2 is a sub-network with the telepresence robot C designated as a master and the telepresence robots D, E, and F designated as slaves. It is assumed that priorities are given in the following descending order: the telepresence robot C, the telepresence robot D, the telepresence robot E, and the telepresence robot F. In this case, it is assumed that the conversation detector 32 detects that the telepresence robot C (an example of a first slave terminal) designated as a master, and, for example, the telepresence robot D among the telepresence robots D, E, and F (an example of (n-m-1) second slave terminals) designated as slaves are in a conversation state. The telepresence robot D represents an example of j (j is an integer not less than 1 and not more than n-m-2) second slave terminals. In this case, the connection mode switcher 33 disconnects the telepresence robots C and D from the sub-network SN2. Then, the connection mode switcher 33 transmits a connection request for establishing a communication connection with the telepresence robot C to the telepresence robot D via the communicator 31. When the communicator 17 of the telepresence robot D receives the connection request from the cloud server 3, the communicator 17 establishes a communication connection with the telepresence robot C. A sub-network SN4 (an example of a fourth sub-network) may be thus formed with the telepresence robot C as a master and the telepresence robot D as a slave. This makes it possible to configure a network that allows only the user UC of the telepresence robot C and the user UD of the telepresence robot D to converse with each other.

In this case, two telepresence robots, the telepresence robots E and F, are not in a conversation state with the telepresence robot C, that is, there are a plurality of such telepresence robots. In this case, the connection mode switcher 33 disconnects the telepresence robot E and the telepresence robot F from the sub-network SN2, and after designating the telepresence robot E, which has the highest priority between the telepresence robots E and F, as a master and the remaining telepresence robot F as a slave, the connection mode switcher 33 transmits a connection request for establishing a communication connection with the telepresence robot E to the telepresence robot F via the communicator 31. When the communicator 17 of the telepresence robot F receives the connection request from the cloud server 3, the communicator 17 establishes a communication connection with the telepresence robot E. A sub-network SN5 (an example of a fifth sub-network) may be thus formed with the telepresence robot E as a master and the remaining telepresence robot F as a slave. The telepresence robots E and F represent an example of (n-m-1-j) slave terminals.

This configuration helps prevent a situation where the telepresence robots E and F, which are not in a conversation state with the telepresence robot C, are unable to converse with each other, thus allowing for effective utilization of communication resources.

Embodiment 2

With a communication system according to Embodiment 2, while a basic network BN is formed, a sub-network is formed to perform private communication between some of the telepresence robots 1 designated as slaves. In Embodiment 2, components identical to those of Embodiment 1 will be denoted by the same reference symbols to avoid repetitive description.

Figure 11:
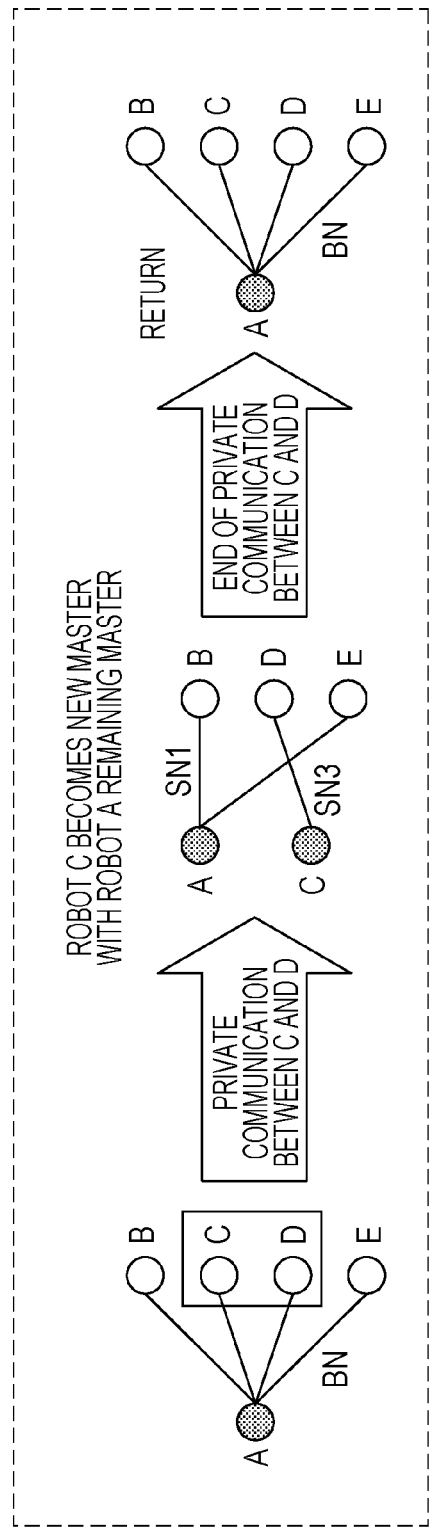
FIG. 11 illustrates an overview of a process performed by a communication system according to Embodiment 2 of the present disclosure.

FIG. 11 illustrates an overview of a process performed by the communication system according to Embodiment 2 of the present disclosure. As with Embodiment 1, the priorities of the telepresence robots A to E are in the following descending order: the telepresence robot A, the telepresence robot B, the telepresence robot C, the telepresence robot D, and the telepresence robot E. That is, the telepresence robot A has the highest priority, and the telepresence robot E has the lowest priority. In the left diagram of FIG. 11, a basic network BN is formed with the telepresence robot A as a master and the telepresence robots B to E as slaves. In this state, it is assumed that the conversation detector 32 has acquired a leave request from, for example, the telepresence robot C among the telepresence robots B to E via the communicator 31. This leave request is a request made to request a leave from the basic network BN to perform private communication with the telepresence robot D. The leave request is input by the user UC via the telepresence robot C.

In this case, the connection mode switcher 33 disconnects the telepresence robots C and D from the basic network BN. Then, the connection mode switcher 33 identifies, as a master, the telepresence robot C having the highest priority between the telepresence robots C and D, and identifies the remaining telepresence robot D as a slave. Subsequently, the connection mode switcher 33 transmits a connection request for establishing a communication connection with the telepresence robot C to the telepresence robot D via the communicator 31. Upon receiving the connection request, the telepresence robot D establishes a communication connection with the telepresence robot C. Thus, as illustrated in the middle diagram of FIG. 11, a sub-network SN3 (an example of a third sub-network) is formed in which the telepresence robot C, which has the highest priority between the telepresence robot C and the telepresence robot D, is designated as a master and the telepresence robot D is designated as a slave. At the same time, as the telepresence robot C and the telepresence robot D are disconnected from the basic network BN by the connection mode switcher 33, a sub-network SN1 is formed as a result in which the telepresence robot A, which has the highest priority among the telepresence robots A, B, and E, is designated as a master and the telepresence robots B and E are designated as slaves. It may be noted that the telepresence robots C and D represent an example of k (k is an integer not less than 2 and not more than n-1) slave terminals.

When the connection mode switcher 33 detects the end of a conversation state between the telepresence robot C and the telepresence robot D, the connection mode switcher 33 disconnects the telepresence robots C and D from the sub-network SN3, and designates each of the disconnected telepresence robots C and D as a slave. The connection mode switcher 33 transmits a connection request for establishing a communication connection with the telepresence robot A to each of the telepresence robots C and D via the communicator 31. Upon receiving the connection request, each of the telepresence robots C and D establishes a communication connection with the telepresence robot A. As a result, the basic network BN is formed again with the telepresence robot A as a master, and the telepresence robots B to E as slaves. That is, the sub-networks SN1 and SN3 are returned to the basic network BN. At this time, the end of a conversation state is detected when, for example, one of the users UC and UD inputs a private communication end request. However, this is only illustrative of one example. Alternatively, the connection mode switcher 33 may detect the end of a conversation between the users UC and UD from the audio data of the users UC and UD to thereby determine that the conversation state between the telepresence robot C and the telepresence robot D has ended. In this case, the connection mode switcher 33 may determine that the conversation state has ended if no utterance of the user UC or the user UD is detected after the elapse of a predetermined period of time following the detection of the end of an utterance made by the user UC or the user UD.

Figure 12:
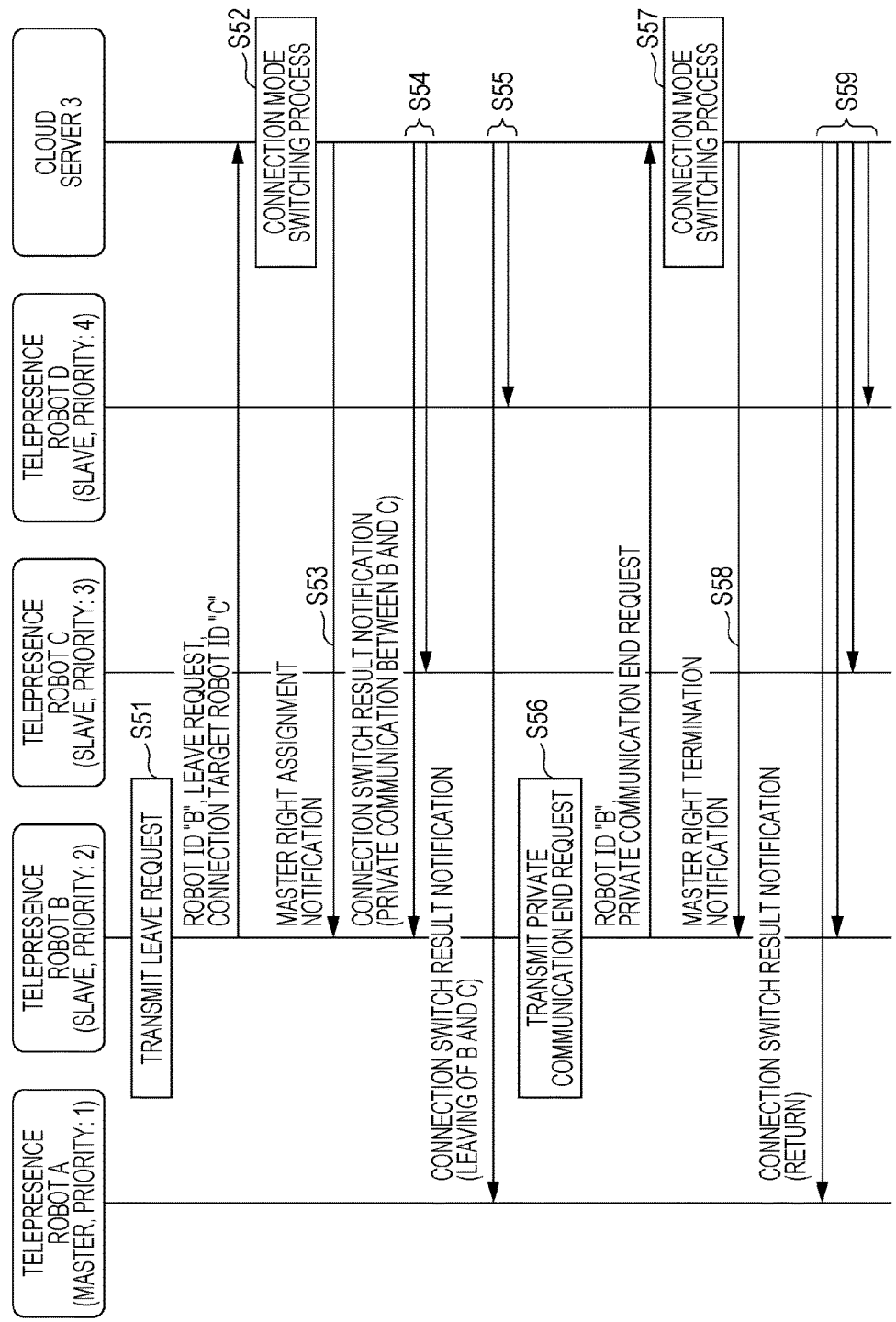
FIG. 12 is a sequence diagram illustrating an exemplary process performed in response to transmission of a leave request in the communication system according to Embodiment 2 of the present disclosure.

FIG. 12 is a sequence diagram illustrating an exemplary process performed in response to transmission of a leave request in the communication system according to Embodiment 2 of the present disclosure. It is assumed that a basic network BN with the telepresence robot A designated as a master and the telepresence robots B to D designated as slaves is formed prior to initiating the process illustrated in FIG. 12.

At S51, when the instruction acquirer 16 of the telepresence robot B receives, from the user UB, an input of an instruction indicating a leave request with the telepresence robot C specified as a connection target, the instruction acquirer 16 associates the leave request with the robot ID "B" of the telepresence robot B and the robot ID "C" of the connection target, and transmits the leave request and the robots IDs to the cloud server 3 via the communicator 17. Although the above description is directed to an implementation that specifies the telepresence robot 1 to which connection is to be made, it is also possible to employ an implementation that specifies a target user as with S31 illustrated in FIG. 10.

At S52, when the communicator 31 of the cloud server 3 receives the leave request, the communicator 31 outputs the leave request to the connection mode switcher 33. Upon receiving the leave request, the connection mode switcher 33 executes a connection mode switching process. In the connection mode switching process at S52, the connection mode switcher 33 refers to the priority management DB 35, and identifies, as a master, the telepresence robot B that is the telepresence robot with the highest priority between the telepresence robots B and C related to the leave request. The remaining telepresence robot C becomes a slave. The connection mode switcher 33 transmits a connection request for establishing a communication connection with the telepresence robot B to the telepresence robot C via the communicator 31. Upon receiving the connection request, the telepresence robot C establishes a communication connection with the telepresence robot B. A sub-network SN3 is thus formed with the telepresence robot B as a master and the telepresence robot C as a slave. It may be noted that when the telepresence robots B and C leave the basic network BN, this results in a sub-network SN1 being formed in which the telepresence robot A is as a master and the telepresence robots D and E are slaves.

Then, the connection mode switcher 33 registers the robot IDs of the telepresence robots A and B into the "Master" field in the connection state management DB 34. Further, the connection mode switcher 33 registers the robot ID of the telepresence robot D into the "Slave" field in the connection state management DB 34 in association with the robot ID of the telepresence robot A, and registers the robot ID of the telepresence robot C into the "Slave" field in association with the robot ID of the telepresence robot B. As a result, the fact that the basic network BN has been separated into the sub-network SN1 used for private communication between the telepresence robots A and B, and the sub-network SN3 used for private communication between the telepresence robots C and D, is reflected on the connection state management DB 34.

At S53, the connection mode switcher 33 transmits, to the telepresence robot B via the communicator 31, a master right assignment notification that notifies that the master right has been assigned to the telepresence robot B.

At S54, the connection mode switcher 33 transmits, to each of the telepresence robots B and C via the communicator 31, a connection switch result notification to notify that the sub-network SN3 for performing private communication between the telepresence robot B and the telepresence robot C has been formed.

At S55, the connection mode switcher 33 transmits, to each of the telepresence robots A and D via the communicator 31, a connection switch result notification to notify that the telepresence robots B and C have left the basic network.

At S56, when the instruction acquirer 16 of the telepresence robot B receives an input of an instruction indicating a private communication end request from the user UB, the instruction acquirer 16 associates the private communication end request with the robot ID "B" of the telepresence robot B, and transmits the request and the robot ID to the cloud server 3 via the communicator 17. At this time, an instruction indicating a private communication request may be input by the user UB by, for example, pressing a private communication end request button displayed on the touch panel 15.

At S57, when the communicator 31 of the cloud server 3 receives the private communication end request, the connection mode switcher 33 executes a connection mode switching process. In the connection mode switching process at S57, the connection mode switcher 33 refers to the priority management DB 34, and identifies the telepresence robot B and the telepresence robot C, which are respectively a master and a slave on the sub-network SN3. The connection mode switcher 33 then disconnects the telepresence robots B and C from the sub-network SN3. The connection mode switcher 33 transmits a connection request for establishing a communication connection with the telepresence robot A to each of the telepresence robots B and C via the communicator 31. Upon receiving the connection request, each of the telepresence robots B and C establishes a communication connection with the telepresence robot A. As a result, the basic network BN is formed again with the telepresence robot A as a master and the telepresence robots B to D as slaves.

Then, the connection mode switcher 33 registers the robot ID of the telepresence robot A into the "Master" field in the connection state management DB 34, and registers the respective robot IDs of the telepresence robots B, C, and D into the "Slave" field. As a result, the fact that the sub-networks SN1 and SN3 have been returned to the basic network BN is reflected on the connection state management DB 34.

At S58, the connection mode switcher 33 transmits, to the telepresence robot B via the communicator 31, a master right termination notification to notify that the master right has terminated.

At S59, the connection mode switcher 33 transmits, to each of the telepresence robots A, B, C, and D via the communicator 31, a connection switch result notification to notify that the communication connection has returned to the basic network BN.

As described above, with the communication system according to Embodiment 2, if a leave request for performing private communication between the telepresence robot B and the telepresence robot C, which are slaves, is acquired in a state in which the basic network BN is formed, the telepresence robots B and C are disconnected from the basic network BN, and the sub-network SN3 is formed. As a result, the users of the telepresence robots B and C related to the leave request are able to converse through private communication, without their conversation being heard by a third party.

Although there are two telepresence robots 1 related to a leave request in the example illustrated in FIG. 12, this is only illustrative of one example. There may be three or more telepresence robots related to a leave request. In this case, the user who inputs the leave request may simply specify two or more telepresence robots 1 as connection targets.

Embodiment 3

A communication system according to Embodiment 3 represents a communication system that, while a basic network is formed, switches which telepresence robot 1 serves as a master and which telepresence robot 1 serves as a slave, based on a master right request input by the user of a given telepresence robot 1 designated as a slave. In Embodiment 3, components identical to those of Embodiment 1 will be denoted by the same reference symbols to avoid repetitive description.

Figure 13:
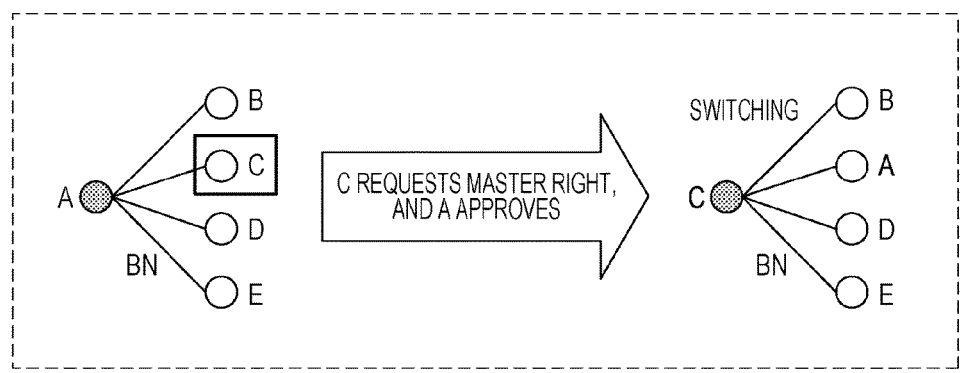
FIG. 13 illustrates an overview of a process performed by a communication system according to Embodiment 3 of the present disclosure.

FIG. 13 illustrates an overview of a process performed by a communication system according to Embodiment 3 of the present disclosure. In the left diagram of FIG. 13, a basic network BN is formed with the telepresence robot A as a master and the telepresence robots B to E as slaves. It is assumed that, in this state, among the slave telepresence robots B to E, for example, the telepresence robot C transmits a master right request that requests transfer of the master right, and the user UA of the master telepresence robot A approves the master right request. In this case, the connection mode switcher 33 forms a basic network BN as illustrated in the right diagram of FIG. 13 with the telepresence robot C switched to a master and the telepresence robot A switched to a slave.

Figure 14:
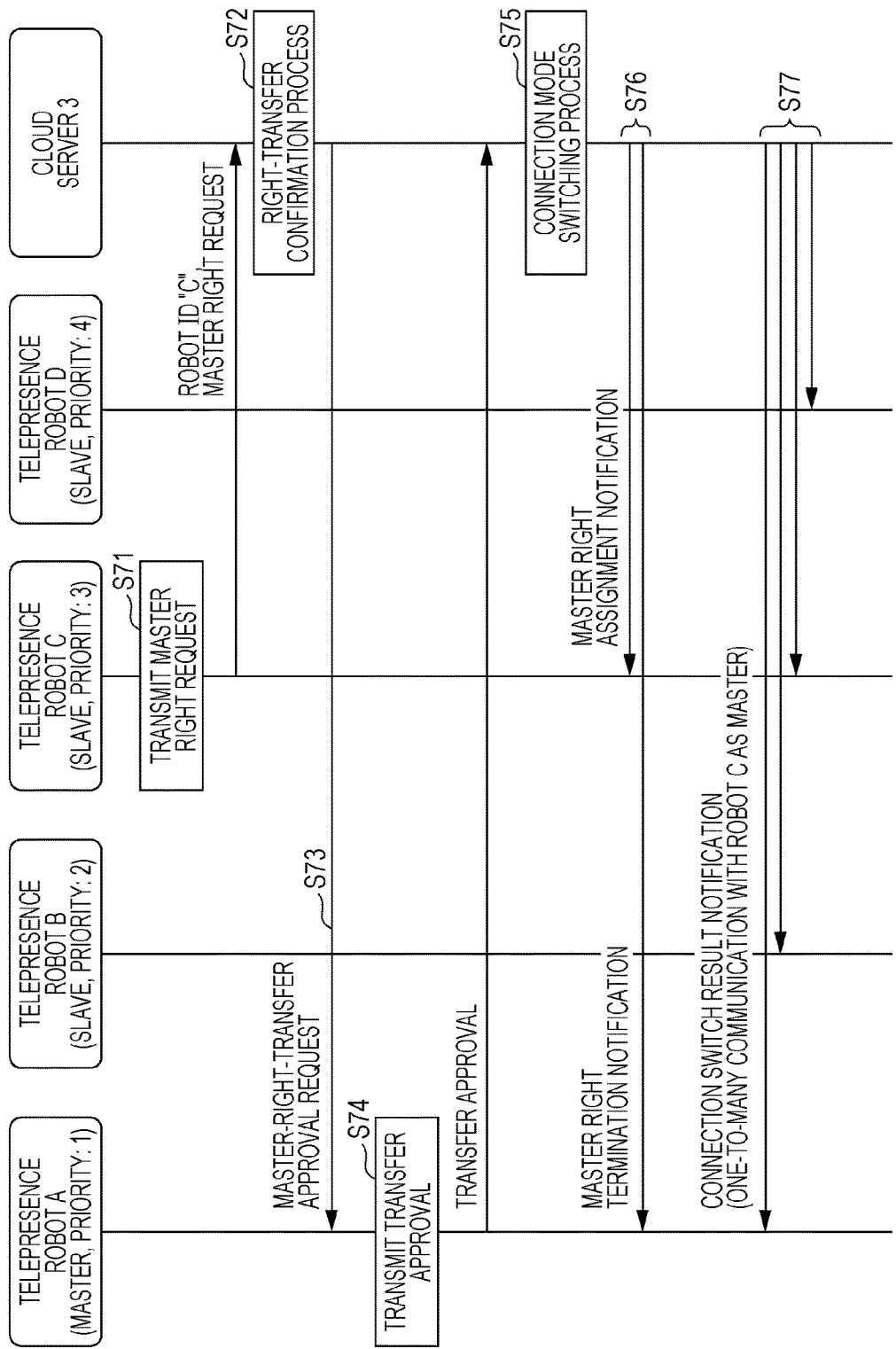
FIG. 14 is a sequence diagram illustrating an exemplary process performed by the communication system according to Embodiment 3 of the present disclosure.

FIG. 14 is a sequence diagram illustrating an exemplary process performed by the communication system according to Embodiment 3 of the present disclosure. The following description assumes that a basic network BN with the telepresence robot A designated as a master and the telepresence robots B to D designated as slaves is formed prior to initiating the process illustrated in FIG. 14.

At S71, when the instruction acquirer 16 of the telepresence robot C receives an input of an instruction indicating a master right request from the user UC, the instruction acquirer 16 associates the master right request with the robot ID "C" of the telepresence robot C, and transmits the request and the robot ID to the cloud server 3 via the communicator 17. At this time, an instruction indicating a master right request may be input by the user UC by, for example, pressing a master right request button displayed on the touch panel 15.

At S72, when the communicator 31 of the cloud server 3 receives the master right request from the telepresence robot C, the communicator 31 outputs the received request to the connection mode switcher 33. Upon receiving the master right request, the connection mode switcher 33 executes a right-transfer confirmation process. In the right-transfer confirmation process, the connection mode switcher 33 transmits, to the telepresence robot A via the communicator 31, a master-right-transfer approval request to confirm with the user UA whether the user UA grants the master right transfer (S73).

At S74, when the instruction acquirer 16 of the telepresence robot A receives, from the user UA as a response to the master-right-transfer approval request, an instruction indicating a transfer approval that approves master right transfer, the instruction acquirer 16 transmits the transfer approval to the cloud server 3. At this time, an instruction indicating a transfer approval may be input by the user UA by, for example, pressing a transfer approval button displayed on the touch panel 15.

At S75, when the communicator 31 of the cloud server 3 receives the transfer approval from the telepresence robot A as a response to the master-right-transfer approval request, the communicator 31 outputs the transfer approval to the connection mode switcher 33. Upon receiving the transfer approval, the connection mode switcher 33 executes a connection mode switching process. In the connection mode switching process at S75, the connection mode switcher 33 disconnects the telepresence robots A to D from the basic network BN. The connection mode switcher 33 designates the telepresence robot C as a master, and designates the telepresence robots A, B, and D as slaves. The connection mode switcher 33 transmits a connection request for establishing a communication connection with the telepresence robot C to each of the telepresence robots A, B, and D via the communicator 31. Upon receiving the connection request, each of the telepresence robots A, B, and D establishes a communication connection with the telepresence robot C. As a result, a basic network BN is formed with the telepresence robot C as a master and the telepresence robots A, B, and D as slaves. The connection mode switcher 33 rewrites the robot ID of the telepresence robot A registered in the "Master" field of the connection state management DB 34 to the robot ID of the telepresence robot C, and rewrites the robot ID of the telepresence robot C registered in the "Slave" field to the robot ID of the telepresence robot A.

At S76, the connection mode switcher 33 transmits a master right assignment notification to the telepresence robot C via the communicator 31. Further, the connection mode switcher 33 transmits, to the telepresence robot A via the communicator 31, a master right termination notification to notify that the master right has terminated.

At S77, the connection mode switcher 33 transmits, to each of the telepresence robots A and D via the communicator 31, a connection switch result notification to notify that the telepresence robot C has become the master.

As described above, with the communication system according to Embodiment 3, for example, the user UC of the telepresence robot C, which is a slave on the basic network BN, transmits a master right request, and if the master right request is approved by the user UA of the telepresence robot A, which is a master, the telepresence robot C is switched to the master, and the telepresence robot A is switched to the slave. A basic network BN is thus formed with the telepresence robot C as a master and the telepresence robots A, B, and D as slaves. Consequently, if a situation arises in which the user of a slave telepresence robot is to converse with other users with this user acting as the center, the network can be changed flexibly to adapt to such a situation.

If, at S74 in FIG. 14, the instruction acquirer 16 of the telepresence robot A receives an input of a reject instruction to reject master right transfer from the user UA as a response to the master-right-transfer approval request, the instruction acquirer 16 transmits the reject instruction to the cloud server 3 via the communicator 17. Then, when the communicator 31 of the cloud server 3 receives the reject instruction from the telepresence robot A as a response to the master-right-transfer approval request, the communicator 31 outputs the received reject instruction to the connection mode switcher 33. Upon receiving the reject instruction, the connection mode switcher 33 may transmit, to the telepresence robot C that has transmitted the master right request, a reject notification to notify that master right transfer has been rejected, and maintain the current connection mode.

Embodiment 4

A communication system according to Embodiment 4 represents a communication system that, while a basic network is formed, causes the master right of the master telepresence robot A to be transferred to another slave telepresence robot 1 upon instruction from the user UA of the telepresence robot A.

Figure 15:
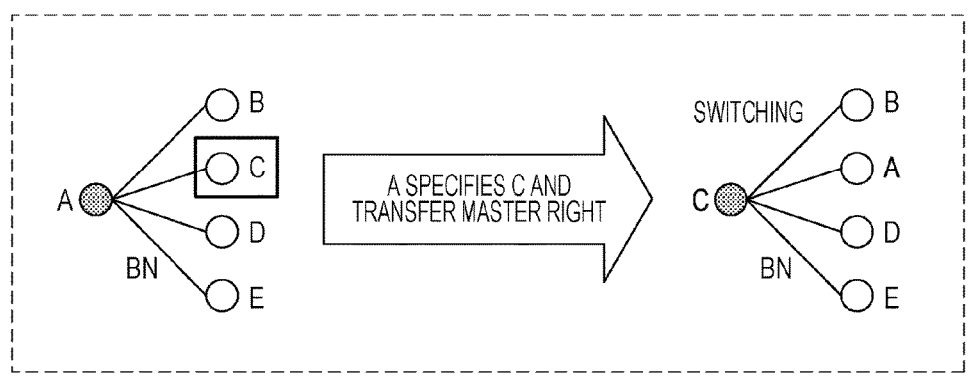
FIG. 15 illustrates an overview of a process performed by a communication system according to Embodiment 4 of the present disclosure.

FIG. 15 illustrates an overview of a process performed by a communication system according to Embodiment 4 of the present disclosure. In the left diagram of FIG. 15, a basic network BN is formed with the telepresence robot A as a master and the telepresence robots B to E as slaves. It is assumed that in this state, the telepresence robot A, which is a master, transmits a master right transfer request that requests transfer of its master right with the telepresence robot C specified as a transfer target, and the user UC of the telepresence robot C approves the master right transfer request. In this case, the connection mode switcher 33 forms a basic network BN as illustrated in the right diagram of FIG. 15 with the telepresence robot C switched to a master and the telepresence robot A switched to a slave.

FIG. 16 is a sequence diagram illustrating an exemplary process performed by the communication system according to Embodiment 4 of the present disclosure. The following description assumes that a basic network BN with the telepresence robot A designated as a master and the telepresence robots B to D designated as slaves is formed prior to initiating the process illustrated in FIG. 16.

At S91, when the instruction acquirer 16 of the telepresence robot A receives, from the user UA, an instruction indicating a master right transfer request with the telepresence robot C specified as a transfer target, the instruction acquirer 16 associates the master right transfer request with the robot ID "A" of the telepresence robot A and with the robot ID "C" of the transfer target, and transmits the request and the robots IDs to the cloud server 3 via the communicator 17. Although the above description is directed to an implementation that specifies the telepresence robot 1 to which to transfer the master right, it is also possible to employ an implementation that specifies a target user as with S31 illustrated in FIG. 10.

At S92, when the communicator 31 of the cloud server 3 receives the master right transfer request, the communicator 31 outputs the master right transfer request to the connection mode switcher 33. Upon receiving the master right transfer request, the connection mode switcher 33 executes a right-acceptance confirmation process. In the right-acceptance confirmation process, the connection mode switcher 33 transmits, to the telepresence robot C, a master-right-acceptance approval request that confirms with the user UC whether the user UC accepts the master right transfer (S93).

At S94, when the instruction acquirer 16 of the telepresence robot C receives, from the user UC as a response to the master-right-acceptance approval request, an instruction indicating an acceptance approval that approves the acceptance of the master right transfer request, the instruction acquirer 16 transfers the acceptance approval to the cloud server 3 via the communicator 17. At this time, an instruction indicating an acceptance approval may be input by the user UC by, for example, pressing an acceptance approval button displayed on the touch panel 15.

The steps from S95 to S97 are the same as S75 to S77 illustrated in FIG. 14, and thus will not be described.

As described above, with the communication system according to Embodiment 4, the user UA is able to transfer the master right to another user if the user UA so desires, thus allowing the network to be changed flexibly to adapt to the needs of the user UA.

If, at S94 in FIG. 16, the instruction acquirer 16 of the telepresence robot C receives, from the user UC, an input of a reject instruction to reject master right transfer as a response to the master-right-acceptance approval request, the instruction acquirer 16 transmits the reject instruction to the cloud server 3 via the communicator 17. When the communicator 31 of the cloud server 3 receives the reject instruction from the telepresence robot C as a response to the master-right-acceptance approval request, the communicator 31 outputs the reject request to the connection mode switcher 33. In this case, the connection mode switcher 33 may, upon receiving the reject instruction, transmit a reject notification to the telepresence robot A to notify that master right transfer has been rejected, and maintain the current connection mode.

Embodiments 1 to 4 may be modified as follows.

(1) Embodiments 1 to 4 may be combined.

(2) Although Embodiments 1 to 4 use the telepresence robot 1 as an example of a terminal corresponding to a master terminal and as an example of a terminal corresponding to a slave terminal, the present disclosure is not limited to this particular arrangement. As such terminals, mobile terminals such as smartphones or tablets, or terminals such as desktop computers may be used.

The communication system according to the present disclosure enables a network to be configured such that if a conversation is initiated between specific users on a one-to-many connection network, only the users who have initiated the conversation are able to converse with each other. This makes it possible to provide a communication system that is useful when applied to office environments where telepresence robots are present.

What is claimed is:

1. A communication control method of a communication controller that controls communication between one master terminal and n (n is an integer not less than 2) slave terminals communicatively connected to the master terminal by a basic network representing a one-to-many connection, the communication control method comprising:

detecting whether the master terminal, and m (m is an integer not less than 1 and not more than n-1) slave terminals among the n slave terminals are in a conversation state; and in response to detecting that the master terminal and the m slave terminals are in the conversation state, disconnecting the master terminal and the m slave terminals from the basic network, and forming a first sub-network, the first sub-network including the master terminal as a master and each of the m slave terminals as a slave.

2. The communication control method according to claim 1, wherein the communication controller includes a priority management database to manage a priority determined in advance for each of the n slave terminals, and wherein the communication control method further comprises, if a number of (n-m) slave terminals corresponding to a number of slave terminals not in the conversation state with the master terminal is two or more, disconnecting the (n-m) slave terminals from the basic network, and forming a second sub-network with a first slave terminal as a master and a second slave terminal as a slave, the first slave terminal being a slave terminal of which the priority is highest among the (n-m) slave terminals, the second slave terminal corresponding to each of remaining (n-m-1) slave terminals.

3. The communication control method according to claim 1, further comprising, in response to detecting an end of the conversation state between the master terminal and the m slave terminals, disconnecting the master terminal and the m slave terminals from the first sub-network, and forming the basic network that includes the master terminal as a master and each of the n slave terminals as a slave again.

4. The communication control method according to claim 2, further comprising, in response to detecting an end of the conversation state between the master terminal and the m slave terminals:

disconnecting the master terminal and the m slave terminals from the first sub-network, and disconnecting the first slave terminal and the (n-m-1) second slave terminals from the second sub-network; and forming the basic network again, the basic network including the master terminal as a master and each of the m slave terminals, the first slave terminal, and the (n-m-1) second slave terminals as a slave.

5. The communication control method according to claim 1,
wherein the communication controller includes a priority management database to manage a priority determined in advance for each of at least the n slave terminals, and
wherein the communication control method further comprises, in response to acquiring, while the master terminal and the n slave terminals are communicatively connected by the basic network, a leave request that requests a leave from the basic network to perform private communication between k (k is an integer not less than 2 and not more than n) slave terminals among the n slave terminals, disconnecting the k slave terminals from the basic network, and forming a third sub-network that includes a master and a slave, the master being a slave terminal of which the priority is highest among the k slave terminals, the slave being each remaining slave terminal.

6. The communication control method according to claim 5, further comprising, in response to detecting an end of a conversation state between the k slave terminals, disconnecting the k slave terminals from the third sub-network, and connecting each of the k slave terminals to the master terminal on the basic network again as a slave.

7. The communication control method according to claim 1, further comprising, while the master terminal and the n slave terminals are communicatively connected by the basic network;
receiving a master right request from one slave terminal among the n slave terminals, the master right request being made by the one slave terminal to request master right transfer;
transmitting a master-right-transfer approval request to the master terminal, the master-right-transfer approval request being a request to confirm with the master terminal whether the master terminal approves master right transfer; and
in response to receiving, from the master terminal as a response to the master-right-transfer approval request, a transfer approval that approves the master right request, switching the approved slave terminal to a master and switching the master terminal to a slave.

8. The communication control method according to claim 1, further comprising, while the master terminal and the n slave terminals are communicatively connected by the basic network;
receiving a master right transfer request from the master terminal, the master right transfer request being a request made by the master terminal to request master right transfer to one slave terminal among the n slave terminals;
transmitting a master-right-acceptance approval request to the one slave terminal, the master-right-acceptance approval request being a request to confirm with the one slave terminal whether the one slave terminal accepts the master right transfer; and
in response to receiving, from the one slave terminal as a response to the master-right-acceptance approval request, an acceptance approval to accept the master right transfer request, switching the one slave terminal that has transmitted the acceptance approval to a master and switching the master terminal to a slave.

9. The communication control method according to claim 2, further comprising, in response to detecting that the first slave terminal, and j (j is an integer not less than 1 and not more than (n-m-2)) second slave terminals among the (n-m-1) second slave terminals are in a conversation state on the second sub-network, disconnecting the first slave terminal and the j second slave terminals from the second sub-network, and forming a fourth sub-network, the fourth sub-network including the first slave terminal as a master and each of the j second slave terminals as a slave.

10. The communication control method according to claim 8, further comprising, if a number of (n-m-1-j) second slave terminals corresponding to a number of second slave terminals that are not in the conversation state is two or more, disconnecting the (n-m-1-j) second slave terminals from the second sub-network, and forming a fifth sub-network that includes a master and a slave, the master being a second slave terminal of which the priority is highest among the (n-m-1-j) second slave terminals, the slave being each of remaining (n-m-2-j) second slave terminals.

11. The communication control method according to claim 1,
wherein the master terminal and the n slave terminals each comprise a telepresence robot used to deliver a message of a communication source user to a communication target user, and
wherein the telepresence robot includes
a communicator that transmits the message,
an autonomous mover that causes the telepresence robot to move autonomously, and
a presenter that presents the message of the communication source user to the communication target user.

12. A communication controller that controls communication between one master terminal and n (n is an integer not less than 2) slave terminals, the n slave terminals being communicatively connected to the master terminal by a basic network representing a one-to-many connection, the communication controller comprising:
a communicator that communicates with the master terminal and the n slave terminals; and
a connection mode switcher that detects whether the master terminal, and m (m is an integer not less than 1 and not more than n-1) slave terminals among the n slave terminals are in a conversation state, and if the master terminal and the m slave terminals are detected to be in the conversation state, disconnects the master terminal and the m slave terminals from the basic network, and forms a first sub-network, the first sub-network including the master terminal as a master and each of the m slave terminals as a slave.

13. A telepresence robot comprising:
a communicator that communicates with the communication controller according to claim 12;
an autonomous mover that causes the telepresence robot to move autonomously; and
a presenter that presents a message.

14. A non-transitory computer-readable recording medium storing a program, the program causing a computer to execute a process, the process comprising:
detecting whether one master terminal, and m (m is an integer not less than 1 and not more than n-1) slave terminals among n (n is an integer not less than 2) slave terminals are in a conversation state, the n slave terminals being communicatively connected to the master terminal by a basic network representing a one-to-many connection; and in response to detecting that the master terminal and the m slave terminals are in the conversation state, disconnecting the master terminal and the m slave terminals from the basic network, and forming a first sub-network, the first sub-network including the master terminal as a master and each of the m slave terminals as a slave.

* * * * *